US009606591B2

(12) United States Patent
Kwon et al.

(10) Patent No.: US 9,606,591 B2
(45) Date of Patent: Mar. 28, 2017

(54) SURFACE TEMPERATURE MANAGEMENT METHOD OF MOBILE DEVICE AND MEMORY THERMAL MANAGEMENT METHOD OF MULTICHIP PACKAGE

(75) Inventors: Heungkyu Kwon, Seongnam-si (KR); Jae Choon Kim, Incheon (KR); Eunseok Cho, Suwon-si (KR); Jichul Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 600 days.

(21) Appl. No.: 13/617,619

(22) Filed: Sep. 14, 2012

(65) Prior Publication Data

US 2013/0091348 A1     Apr. 11, 2013

(30) Foreign Application Priority Data

Oct. 10, 2011     (KR) ........................ 10-2011-0102804

(51) Int. Cl.
*G06F 1/20*            (2006.01)

(52) U.S. Cl.
CPC .................................. *G06F 1/206* (2013.01)

(58) Field of Classification Search
CPC .......... G06F 9/52; G06F 1/206; G06F 1/3206; G06F 1/203; G06F 11/3058; G06F 2217/80; G01K 1/08; G01K 1/16; G01K 7/00; G01K 7/425; H04M 2250/12
USPC .. 374/208, 178, 1, 29, 30, 44, 45, 4, 140, 5; 702/130, 99; 327/512, 513; 700/300; 713/600, 501, 503; 455/550.1
See application file for complete search history.

(56) References Cited

U.S. PATENT DOCUMENTS

| | | | | | |
|---|---|---|---|---|---|
| 4,703,442 | A | * | 10/1987 | Levine | .................. H04N 5/367 348/244 |
| 5,974,556 | A | * | 10/1999 | Jackson | .................. G06F 1/203 327/509 |
| 6,470,289 | B1 | * | 10/2002 | Peters | ..................... G01K 7/42 374/10 |
| 6,557,072 | B2 | | 4/2003 | Osborn | |
| 6,636,910 | B2 | * | 10/2003 | Kung | ...................... G06F 1/206 710/48 |
| 7,036,030 | B1 | * | 4/2006 | Altmejd | ............... G06F 1/3228 713/322 |
| 7,360,102 | B2 | * | 4/2008 | Inoue | ..................... G06F 1/206 713/300 |

(Continued)

FOREIGN PATENT DOCUMENTS

| | | | |
|---|---|---|---|
| JP | 2005-117365 A | 4/2005 | |
| JP | WO 2006059533 A1 * | 6/2006 | ............. H04B 1/036 |

(Continued)

*Primary Examiner* — Gail Kaplan Verbitsky
(74) *Attorney, Agent, or Firm* — Sughrue Mion, PLLC

(57) ABSTRACT

A surface temperature management method of mobile device is provided. The method includes sensing a temperature of an application processor in an operation mode of the mobile device; and controlling the application processor using the sensed temperature and a surface temperature management table to manage a surface temperature of a target part of the mobile device. The surface temperature management table includes information related to the temperature of the application processor corresponding to the surface temperature of the target part in the operation mode.

7 Claims, 28 Drawing Sheets

(56) References Cited

U.S. PATENT DOCUMENTS

| | | | |
|---|---|---|---|
| 7,464,277 B2 * | 12/2008 | Prosperi | G06F 1/206 713/300 |
| 7,520,669 B2 | 4/2009 | Yazawa et al. | |
| 7,742,353 B2 * | 6/2010 | Chen | G11C 7/04 365/196 |
| 8,595,517 B2 * | 11/2013 | Riechel et al. | 713/300 |
| 8,768,666 B2 * | 7/2014 | Anderson | G06F 1/206 703/6 |
| 8,943,336 B2 * | 1/2015 | Shah | G06F 1/206 713/300 |
| 8,953,839 B2 * | 2/2015 | Murao | G06K 9/00825 382/103 |
| 9,160,348 B2 * | 10/2015 | Jung | H03K 3/0315 |
| 9,232,135 B2 * | 1/2016 | Kim | H04N 5/23241 |
| 2003/0064749 A1 | 4/2003 | Soini et al. | 455/556 |
| 2003/0097234 A1 | 5/2003 | Tanabe | 702/130 |
| 2004/0122605 A1 * | 6/2004 | Miyazaki | 702/57 |
| 2005/0216102 A1 * | 9/2005 | Tanizawa | G01D 3/022 700/28 |
| 2006/0004538 A1 * | 1/2006 | Cancel | G06F 1/206 702/136 |
| 2006/0054713 A1 * | 3/2006 | Wang | H05K 7/20209 236/49.3 |
| 2006/0242447 A1 * | 10/2006 | Radhakrishnan et al. | 713/501 |
| 2006/0290365 A1 * | 12/2006 | Riedlinger | G01R 31/2856 324/750.03 |
| 2007/0047990 A1 * | 3/2007 | Lemaster et al. | 399/69 |
| 2007/0173249 A1 * | 7/2007 | Ogoshi | 455/423 |
| 2008/0004067 A1 * | 1/2008 | Piipponen et al. | 455/550.1 |
| 2008/0025341 A1 * | 1/2008 | Rao | H04W 72/048 370/468 |
| 2008/0059004 A1 * | 3/2008 | Katoh et al. | 700/300 |
| 2008/0077282 A1 * | 3/2008 | Hartman et al. | 700/300 |
| 2008/0234951 A1 * | 9/2008 | Kim | G01N 3/18 702/52 |
| 2009/0305732 A1 | 12/2009 | Marcellino et al. | |
| 2009/0307105 A1 | 12/2009 | Lemay et al. | |
| 2010/0010040 A1 | 1/2010 | Jones et al. | |
| 2010/0030395 A1 * | 2/2010 | Shimotono et al. | 700/300 |
| 2010/0062715 A1 | 3/2010 | Kim et al. | |
| 2010/0115293 A1 * | 5/2010 | Rotem et al. | 713/300 |
| 2010/0169562 A1 * | 7/2010 | Jin | G06F 12/0638 711/105 |
| 2010/0309237 A1 | 12/2010 | Roh | |
| 2011/0013353 A1 | 1/2011 | Kwon et al. | |
| 2011/0273378 A1 * | 11/2011 | Alameh et al. | 345/173 |
| 2011/0283132 A1 * | 11/2011 | Song et al. | 713/340 |
| 2013/0007440 A1 * | 1/2013 | Shah | G06F 1/206 713/100 |
| 2013/0041614 A1 * | 2/2013 | Shepard | G01J 5/0014 702/130 |
| 2013/0063367 A1 * | 3/2013 | Jang | 345/173 |
| 2014/0208143 A1 * | 7/2014 | Vorbach | G06F 1/206 713/322 |
| 2014/0362889 A1 * | 12/2014 | Jang | G01K 13/00 374/152 |
| 2015/0181149 A1 * | 6/2015 | Awatani | H04N 5/37455 348/300 |

FOREIGN PATENT DOCUMENTS

| | | | |
|---|---|---|---|
| JP | 2008005031 A * | 1/2008 | |
| JP | 2013161176 A * | 8/2013 | |
| KR | 20050000269 A * | 1/2005 | |
| KR | 10-0711721 A | 4/2007 | |
| KR | 10-2010-0054669 A | 5/2010 | |
| WO | WO 2008020387 A2 * | 2/2008 | |

* cited by examiner

Fig. 3

| Operation Mode | Surface Temperature(Ts) | Surface Area | AP Temperature(Ta) | AP Frequency(f) | Frame Rate(FR) |
|---|---|---|---|---|---|
| Game | T1: 45°C | A1 | HT1: Ta_g1 | Down | Down |
| | T2: 36°C | A1 | HT2: Ta_g2 | Down | Down |
| | T3: 25°C | A1 | LT: Ta_g3 | Up | Up |
| Image Capturing | T1: 45°C | A2 | HT1: Ta_i1 | Down | Down |
| | T2: 36°C | A2 | HT2: Ta_i2 | Down | Down |
| | T3: 25°C | A2 | LT: Ta_i3 | Up | Up |
| Web Browsing | T1: 45°C | A3 | HT1: Ta_w1 | Down | Down |
| | T2: 36°C | A3 | HT2: Ta_w2 | Down | Down |
| | T3: 25°C | A3 | LT: Ta_w3 | Up | Up |
| Video Play | T1: 45°C | A4 | HT1: Ta_v1 | Down | Down |
| | T2: 36°C | A4 | HT2: Ta_v2 | Down | Down |
| | T3: 25°C | A4 | LT: Ta_v3 | Up | Up |

Fig. 8

| Operation Mode | Surface Temperature(Ts) | Surface Area | IS Temperature(Ti) | Frame Rate(FR) |
|---|---|---|---|---|
| Game | T1: 45°C | A1 | HT1: Ti_g1 | Down |
| | T2: 36°C | A1 | HT2: Ti_g2 | Down |
| | T3: 25°C | A1 | LT: Ti_g3 | Up |
| Image Capturing | T1: 45°C | A2 | HT1: Ti_i1 | Down |
| | T2: 36°C | A2 | HT2: Ti_i2 | Down |
| | T3: 25°C | A2 | LT: Ti_i3 | Up |
| Web Browsing | T1: 45°C | A3 | HT1: Ti_w1 | Down |
| | T2: 36°C | A3 | HT2: Ti_w2 | Down |
| | T3: 25°C | A3 | LT: Ti_w3 | Up |
| Video Play | T1: 45°C | A4 | HT1: Ti_v1 | Down |
| | T2: 36°C | A4 | HT2: Ti_v2 | Down |
| | T3: 25°C | A4 | LT: Ti_v3 | Up |

Fig. 12

| Operation Mode | Surface Temperature(Ts) | Surface Area | AP Temperature (Ta) | AP Frequency (f) | IS Temperature (Ti) | Frame Rate(FR) |
|---|---|---|---|---|---|---|
| Game | T1: 45°C | A1 | HT1: Ta_g1 | Down | HT1: Ti_g1 | Down |
| | T2: 36°C | A1 | HT2: Ta_g2 | Down | HT2: Ti_g2 | Down |
| | T3: 25°C | A1 | LT: Ta_g3 | Up | LT: Ti_g3 | Up |
| Image Capturing | T1: 45°C | A2 | HT1: Ta_i1 | Down | HT1: Ti_i1 | Down |
| | T2: 36°C | A2 | HT2: Ta_i2 | Down | HT2: Ti_i2 | Down |
| | T3: 25°C | A2 | LT: Ta_i3 | Up | LT: Ti_i3 | Up |
| Web Browsing | T1: 45°C | A3 | HT1: Ta_w1 | Down | HT1: Ti_w1 | Down |
| | T2: 36°C | A3 | HT2: Ta_w2 | Down | HT2: Ti_w2 | Down |
| | T3: 25°C | A3 | LT: Ta_w3 | Up | LT: Ti_w3 | Up |
| Video Play | T1: 45°C | A4 | HT1: Ta_v1 | Down | HT1: Ti_v1 | Down |
| | T2: 36°C | A4 | HT2: Ta_v2 | Down | HT2: Ti_v2 | Down |
| | T3: 25°C | A4 | LT: Ta_v3 | Up | LT: Ti_v3 | Up |

SURFACE TEMPERATURE MANAGEMENT METHOD OF MOBILE DEVICE AND MEMORY THERMAL MANAGEMENT METHOD OF MULTICHIP PACKAGE

CROSS-REFERENCE TO RELATED APPLICATIONS

This application claims priority from Korean Patent Application No. 10-2011-0102804, filed on Oct. 10, 2011, the entire contents of which are hereby incorporated by reference.

BACKGROUND

Methods consistent with the present inventive concept relate to a surface temperature management method of a mobile device and a memory thermal management method of a multichip package.

A communication system or a computer system is a multi-processor system including one or more processors that perform unique work. For example, in a mobile communication system such as a cellular phone, a baseband processor is used to process communication data and an application processor is used to process a photograph and a video.

SUMMARY

According to an aspect of an exemplary embodiment, there is provided a surface temperature management method of a mobile device, the method including sensing a temperature of an application processor in an operation mode of the mobile device; and controlling the application processor using the sensed temperature and a surface temperature management table to manage a surface temperature of a target part of the mobile device, wherein the surface temperature management table comprises information related to the temperature of the application processor corresponding to the surface temperature of the target part in the operation mode.

According to an aspect of another exemplary embodiment, there is provided a memory thermal management method of a multichip package having a memory stacked on an application processor, the method comprising distinguishing whether a memory temperature of the memory is higher than or equal to a first value; controlling the application processor to lower the memory temperature when the memory temperature is higher than or equal to the first value; distinguishing whether the memory temperature is lower than or equal to a second value; and controlling the application processor to improve performance of the multichip package when the memory temperature is lower than or equal to the second value.

BRIEF DESCRIPTION OF THE DRAWINGS

Exemplary embodiments will be described below in more detail with reference to the accompanying drawings, in which:

FIG. 3 is a surface temperature management table in accordance with some exemplary embodiments;

FIG. 8 is a surface temperature management table used in the dynamic thermal management (DTM) module illustrated in FIG. 7;

FIG. 12 is a surface temperature management table used in the dynamic thermal management (DTM) module illustrated in FIG. 11;

DETAILED DESCRIPTION

Figure 1:
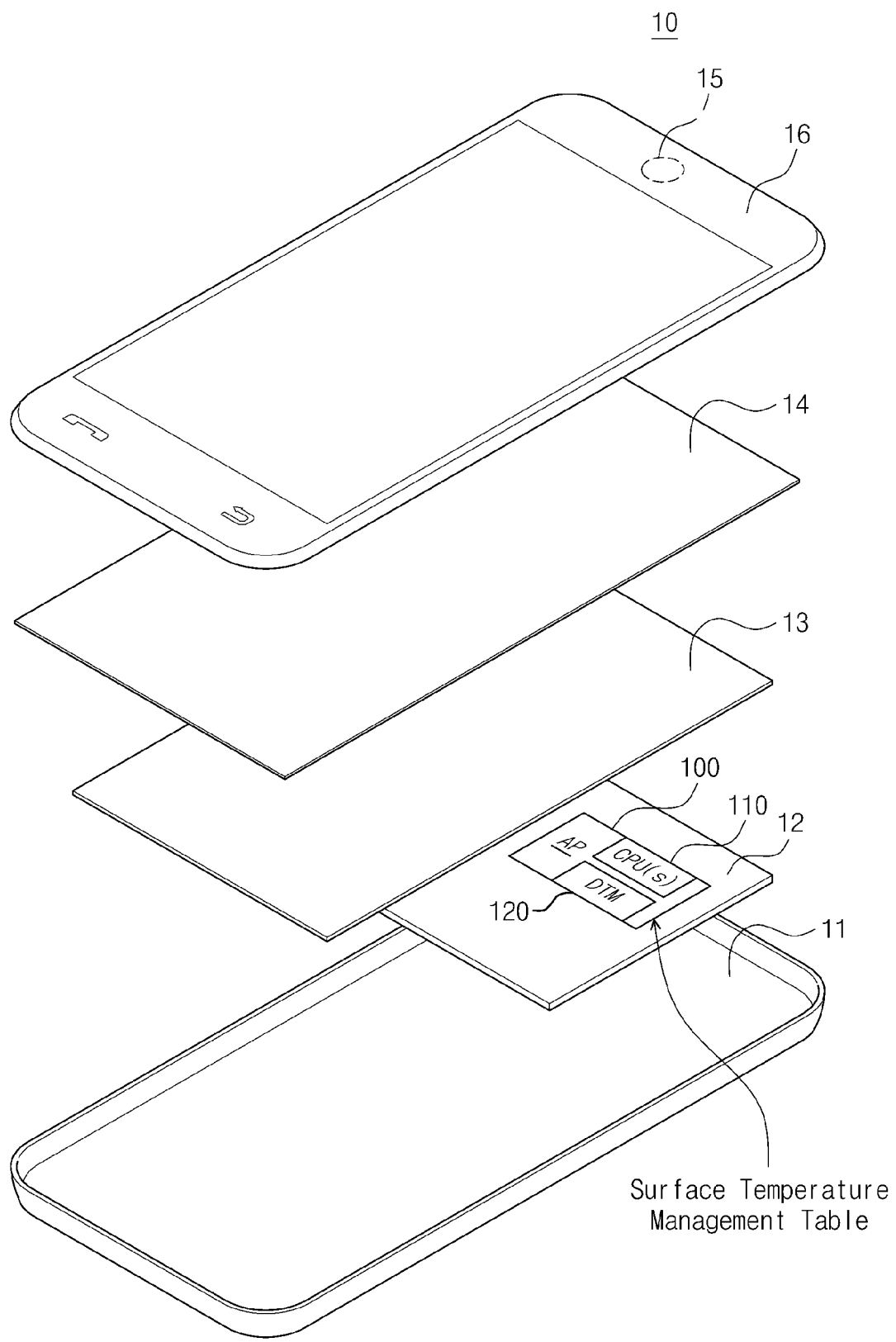
FIG. 1 is a disassembled perspective view of a mobile device in accordance with some exemplary embodiments.

Exemplary embodiments of inventive concepts will be described more fully hereinafter with reference to the accompanying drawings, in which exemplary embodiments are shown. This inventive concept may, however, be embodied in many different forms and should not be construed as limited to the exemplary embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

A Surface Temperature Management of Mobile Device

FIG. 1 is a disassembled perspective view of mobile device in accordance with some exemplary embodiments. Referring to FIG. 1, a mobile device 10 includes a housing 11, a printed circuit board 12, a display panel 13, a touch screen 14, an image sensor 15 and a window material 16.

The mobile device 10 illustrated in FIG. 1 illustrates a cellular phone as an example. The mobile device 10 is not limited to a cellular phone and may be an information providing device such as a television, a navigator, a computer monitor, a game machine, a tablet PC, etc.

The housing 11 stores internal components (for example, the printed circuit board 12, the display panel 13 and the touch screen 14) of the mobile device 10. In FIG. 1, a housing constituted by one material is illustrated as an example. However, the housing 11 may be constituted by at least two materials. In exemplary embodiments, the housing 11 may further store a power supply portion (not illustrated) such as a battery depending on the type of display panel.

On the printed circuit board 12, at least one active device (not illustrated) and/or at least one passive device (not illustrated) are mounted to drive the mobile device 10. The printed circuit board 12 includes an application processor (AP) 100 processing multimedia data (photograph or video) using an application program. The application program may be stored in a memory device (not illustrated) inside the AP 100.

The AP 100 may include at least one central processing unit (CPU) 110 and a dynamic thermal management module 120.

The dynamic thermal management module 120 manages heat of a target part in the mobile device 10 on the basis of a surface temperature. The target part may be the housing 11, the display panel 13, the touch screen 14, the window material 16 or a specific internal component.

In exemplary embodiments, the dynamic thermal management module 120 may be embodied so that a surface temperature of the target part does not exceed a threshold value.

In exemplary embodiments, the dynamic thermal management module 120 may be embodied by hardware, software or firmware. It is assumed that the dynamic thermal management module 120 is embodied by firmware. In the case that the dynamic thermal management module 120 is embodied by firmware, a manufacturer of the mobile device 10 may update the dynamic thermal management module 120 any timey.

In exemplary embodiments, the dynamic thermal management module 120 may include a surface temperature management table having information to manage heat of the mobile device 10 in real time on the basis of surface temperature. The surface temperature management table may be set up by manufacturer of the mobile device 10.

In exemplary embodiments, the surface temperature management table includes AP temperature information, AP operation frequency control information, frame rate control information, etc. so that a surface temperature of the mobile device 10 does not exceed a threshold value according to an operation mode of the mobile device 10. For example, the surface temperature management table may include AP temperature information, AP operation frequency control information and frame rate control information so that a surface temperature of the mobile device 10 does not exceed about 45° C. when shooting a video.

The display panel 13 displays an image. The display panel 13 is not limited to any particular display technology and may be, for example, an organic light emitting display panel, a liquid crystal display panel, a plasma display panel, an electrophoretic display panel and an electrowetting display panel.

The touch panel 14 is an input means of the display panel 13 and calculates coordinate information of a touched point. The touch panel 14 may be, for example, a resistance type touch panel or a capacitance type touch panel.

The resistance type touch panel may be an analog resistance type touch panel including two resistance films disposed to be spaced apart from each other or a digital resistance type touch panel including first resistance patterns and second resistance patterns disposed to be spaced apart from the first resistance patterns. The resistance type touch panel calculates coordinate information of contact point by detecting a voltage output when two resistance films contact each other by external pressure or the first resistance patterns and the second resistance patterns contact each other by external pressure.

The capacitance type touch panel includes first sensing patterns and second sensing patterns that are insulated from the first sensing patterns and disposed to cross the first sensing patterns. When an input means contacts the capacitance type touch panel, the capacitance type touch panel detects a change of electro capacity generated from the first and second sensing patterns and calculates coordinate information of contact point on the basis of the change of electrostatic capacity. The capacitance type touch panel will be described in detail in U.S. Patent Application Publication No. 2010-0010040 assigned to Samsung Electronics Co., Ltd., the contents of which is herein incorporated by reference.

The image sensor 15 senses a photograph or a video. In exemplary embodiments, the image sensor 15 may be a CMOS image sensor. The image sensor 15 illustrated in FIG. 1 is located in the window material 16. However, location of the image sensor 15 is not limited thereto.

The window material 16 is disposed on the touch panel 14 and is combined with the housing 11 to form an outside surface of the mobile device 10 together with the housing 11. The touch panel 14 may be combined with the window material 16. The window material 16 may include a display area AR on which an image generated from the display panel 13 is displayed and an area NAR on which an image is not displayed, the area NAR being adjacent to at least a part of the display area AR.

The mobile device 10, although not illustrated in FIG. 1, may further include a wireless communication portion for a wireless communication, a memory portion (volatile memory/nonvolatile memory) to store data, a microphone, a speaker and an audio processing portion, etc. Various compositions of the mobile device 10 are described in detail in U.S. Patent Application Publication No. 2010-0062715 and U.S. Patent Application Publication No. 2010-0309237, the contents of each of which are incorporated by reference herein.

The mobile device 10 may manage a surface temperature of a target part corresponding to an operation mode using a temperature of the sensed AP 100 and a surface temperature management table.

Figure 2:
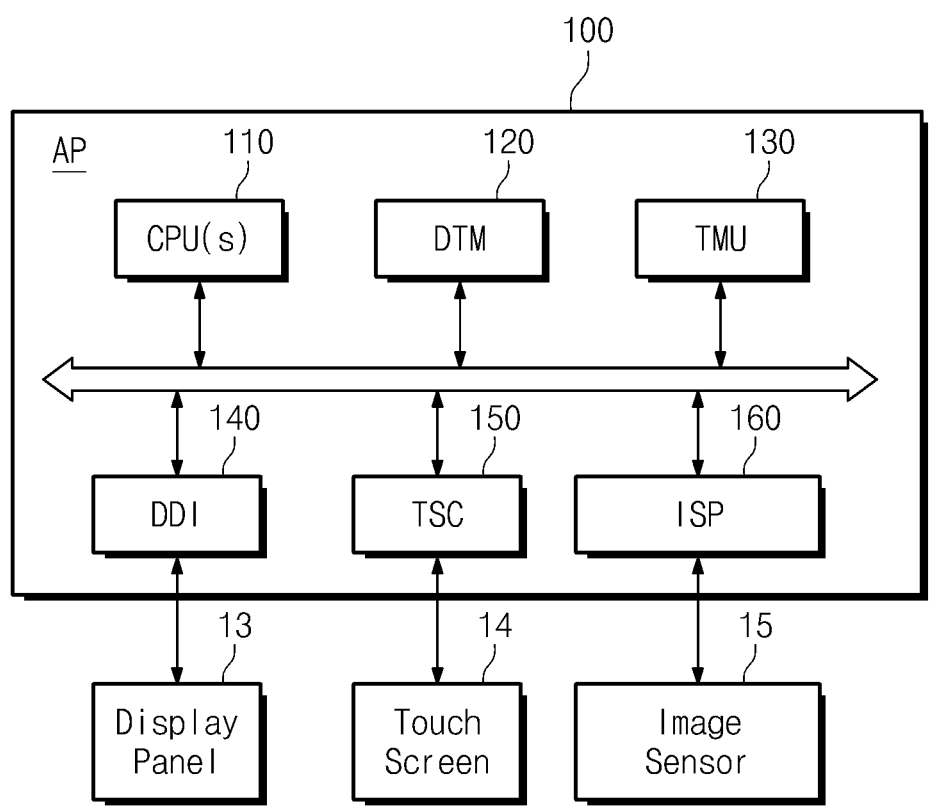
FIG. 2 is a first block diagram of mobile device for describing a method of managing a surface temperature in accordance with some exemplary embodiments.

FIG. 2 is a first block diagram of mobile device for describing a method of managing a surface temperature in accordance with some exemplary embodiments. Referring to FIG. 2, an application processor 100 may include a central processing unit (CPU) 110 controlling the whole operation, a dynamic thermal management module (DTM) 120 managing a surface temperature of the mobile device 10 according to a temperature of the AP 100 and a surface temperature management table, a temperature measurement unit (TMU) 130 sensing a temperature of the AP 100, a display driving integrated circuit (DDI) 140 controlling a display panel 13, a touch screen controller (TSC) 150 controlling a touch panel 14 and an image sensor processor (ISP) 160 controlling an image sensor 15.

In exemplary embodiments, the temperature measurement unit 130 may include a thermal sensor included in the AP 100.

In exemplary embodiments, the temperature measurement unit 130 may sense a junction temperature of the AP 100.

A surface temperature of the mobile device 10 may be managed using a temperature of the AP 100 sensed by the temperature measurement unit 130 and a surface temperature management table.

FIG. 3 is a surface temperature management table in accordance with some exemplary embodiments. Referring to FIG. 3, the surface temperature management table includes surface temperature information, surface area information, AP temperature information, AP operation frequency control information and frame rate control information in accordance with an operation mode.

An operation mode includes a game, an image capturing, a web browsing and a video play. The operation mode illustrated in FIG. 3 is only an exemplary embodiment and not limited thereto.

The surface temperature information includes reference surface temperatures T1, T2 and T3 of target part (for example, the housing 11, the printed circuit board 12, the display panel 13, the touch screen 14, the window material 16 or a specific component that are illustrated in FIG. 1) for managing a surface temperature Ts in the mobile device 10.

The reference surface temperatures T1, T2 and T3 are direction temperatures for determining a management range with respect to the surface temperature Ts of target part. For example, if the reference surface temperature T1 is 45° C., the reference surface temperature T1 is 36° C. and the reference surface temperature T1 is 26° C., a management range of the surface temperature Ts may be divided into four sections of more than 45° C., 35° C.-45° C., 26° C.-35° C. and less than 26° C.

The target part managing the surface temperature Ts may be different according to the operation mode. For example, if the operation mode is a game, the target part may be the printed circuit board 12 and if the operation mode is an image capturing, the target part may be the image sensor 15.

The surface area information is information relative to a surface area of target part for managing the surface temperature Ts. In some exemplary embodiments, a size of surface area of the target part may be different according to the operation mode (A1-A4). Just as in some exemplary embodiments the target part for managing the surface temperature Ts is different, a size of the surface area may also be different depending on the operation mode. In some other exemplary embodiments, a size of surface area of the target part may be equal according to the operation mode (A1=A2=A3=A4).

The AP temperature information includes target temperatures HT1, HT2 and LT corresponding to the reference surface temperatures T1, T2 and T3 according to the operation mode.

The target temperatures HT1, HT2 and LT which reach the reference surface temperatures T1, T2 and T3 may be different according to the operation mode. For example, a first target high temperature HT1 of when the surface temperature Ts is 45° C. in a game operation mode is Ta_g1 (e.g., 95° C.) and a first target high temperature HT1 of when the surface temperature Ts is 45° C. in a web browsing operation is Ta_w1 (e.g, 105° C.). The number of the target temperatures HT1, HT2 and LT illustrated in FIG. 3 is three. However, the present inventive concept is not limited thereto. The number of the target temperatures in accordance with exemplary embodiments may less than or more than three, and may be at least one.

The AP operation frequency control information includes information for increasing or decreasing an AP operation frequency (or CUP operation frequency) in response to an AP temperature Ta according to the operation mode.

The AP operation frequency control information includes information to decrease an AP operation frequency when the AP temperature Ta becomes the first target high temperature (HT1: Ta_g1) in the game operation. For example, the AP operation frequency may be set to be low from about 1.5 GHz to about 1.3 GHz when the AP temperature Ta becomes the first target high temperature (HT1: Ta_g1) in the game operation.

The AP operation frequency control information includes information to decrease an AP operation frequency when the AP temperature Ta becomes the second target high temperature (HT2: Ta_g2) in the game operation. For example, the AP operation frequency may be set to be low from about 1.3 GHz to about 1.2 GHz when the AP temperature Ta becomes the second target high temperature (HT2: Ta_g2) in the game operation.

The AP operation frequency control information includes information to increase an AP operation frequency when the AP temperature Ta becomes a target low temperature (LT: Ta_g3) in the game operation. For example, the AP operation frequency may be set to be low from about 1.2 GHz to about 1.5 GHz when the AP temperature Ta becomes a target low temperature (LT: Ta_g3) in the game operation.

The AP operation frequency control information includes information for increasing or decreasing an AP operation frequency by stages in response to the target high temperature (for example, HT1, HT2 and LT).

The frame rate control information includes information for increasing or decreasing a frame rate in response to the AP temperature Ta according to the operation mode.

The frame rate control information includes information to decrease a frame rate when the AP temperature Ta becomes the first target high temperature (HT1:Ta_i1) in the image capturing.

The frame rate control information includes information to decrease a frame rate when the AP temperature Ta becomes the second target high temperature (HT2:Ta_i2) in the image capturing.

The frame rate control information includes information to increase a frame rate when the AP temperature Ta becomes the target low temperature (LT:Ta_i3) in the image capturing.

The frame rate control information includes information for increasing or decreasing a frame rate by stages in response to the target high temperature (for example, HT1, HT2 and LT). It should be noted that the values "down" and "up" shown in FIG. 3 are only exemplary, and may be different than those shown in the table. These values may be determined experimentally as will be discussed in more detail below.

The surface temperature management table may include a target part, temperature information relative to the target part and AP control information according to an operation mode to manage a surface temperature.

Figure 4:
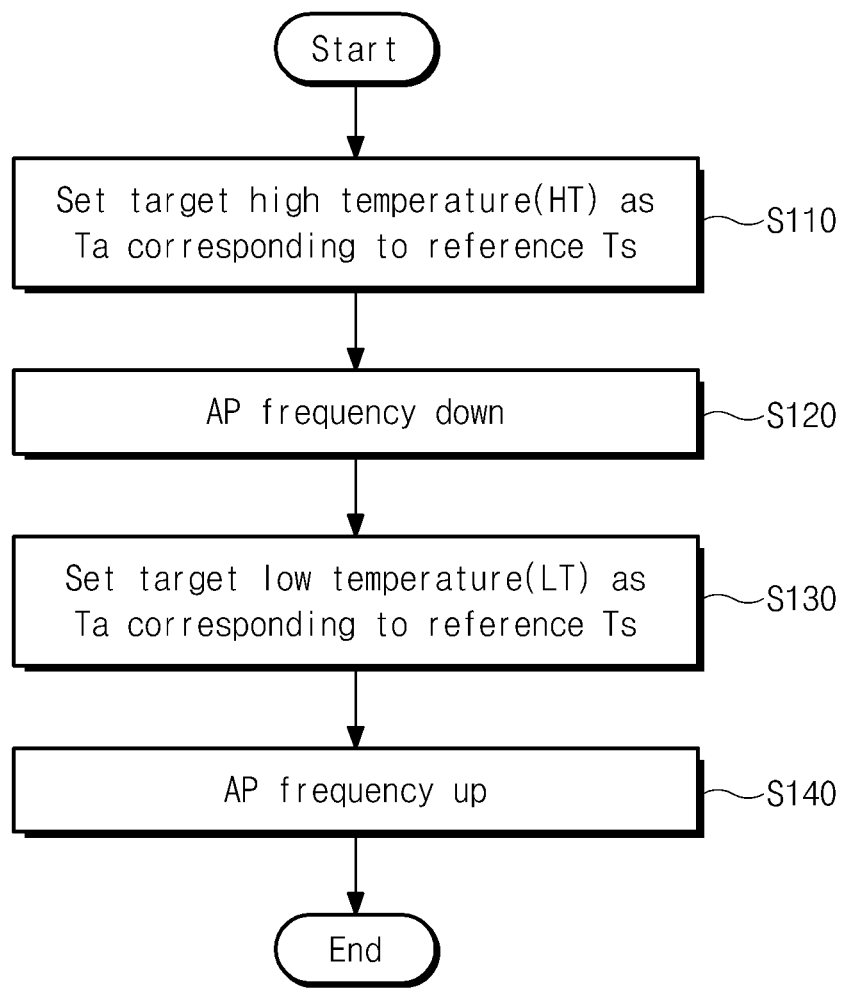
FIG. 4 is a flow chart illustrating a method of setting up a surface temperature management table in accordance with some exemplary embodiments.

FIG. 4 is a flow chart illustrating a method of setting up a surface temperature management table in an engineering step in accordance with some exemplary embodiments. That is, the method is used to set up the surface temperature management table at the manufacturer in, for example, a lab or a test setup during production of the device. Referring to FIGS. 3 and 4, a method of setting up a surface temperature management table is as follows.

The mobile device 10 operates in a specific operation mode. At this time, a surface temperature Ts of target part corresponding to an operation mode is sensed. In a measurement method of surface temperature Ts, a temperature sensor may be used to directly sense a temperature of target part or an infrared sensor may be used to indirectly sense a temperature of target part. An AP temperature Ta corresponding to the sensed reference surface temperature Ts is sensed. The sensed AP temperature Ta is set as a target high temperature HT corresponding to the reference surface temperature Ts in a specific operation mode (S110).

After that, when the AP temperature becomes a target high temperature HT in a specific operation mode, an AP operation frequency is set to be low to lower the surface temperature Ts of target part (S120). Since the mobile device 10 operates in a state that an AP operation frequency is low, the surface temperature Ts of target part is lowered. By repeating the operation S120, when the AP temperature Ta becomes the target high temperature HT in a specific operation mode, the AP operation frequency control information for lowering the surface temperature Ts of target part is set. In a specific operation mode, the AP operation frequency control information may include information to lower an AP operation frequency by stages according to the target high temperature HT. In a specific operation mode, the AP operation frequency control information may include information to lower an AP operation frequency rapidly according to the target high temperature HT.

If the AP operation frequency becomes low, the AP temperature Ta is lowered and the surface temperature Ts of target part is also lowered. If the surface temperature Ts of target part is lowered to a target value, the AP operation frequency may be increased again to improve performance of the specific operation mode. When the surface temperature Ts of target part in the specific operation mode is a target value, the AP temperature Ta is sensed. The sensed AP temperature Ta is set as the target low temperature LT corresponding to the reference surface temperature Ts in the specific operation mode (S130).

After that, when the AP temperature Ta becomes the target low temperature LT in the specific operation mode, an AP operation frequency is increased to improve performance of the specific operation mode (S140). Performance of the specific operation mode of the mobile device 10 may be improved by increasing the AP operation frequency again (S140). By repeating the S140, when the AP temperature Ta becomes the target low temperature LT in the specific operation mode, the AP operation frequency control information to improve performance of the specific operation mode is set up. The AP operation frequency control information may include information to increase the AP operation frequency rapidly according to the target low temperature LT in the specific operation mode. Also, the AP operation frequency control information may include information to increase the AP operation frequency by stages according to the target low temperature LT in the specific operation mode.

The AP operation frequency control information may include information to lower the surface temperature Ts of target part in the specific operation mode and information to improve performance of the specific operation mode.

In FIG. 4, a method of setting up a surface temperature management table relative to the AP operation frequency control information was described. A method of setting up a surface temperature management table relative to the frame rate control information is similar to the method of setting up a surface temperature management table relative to the AP operation frequency control information that was described above. Accordingly, such a method will not be described here for conciseness of description.

Figure 5:
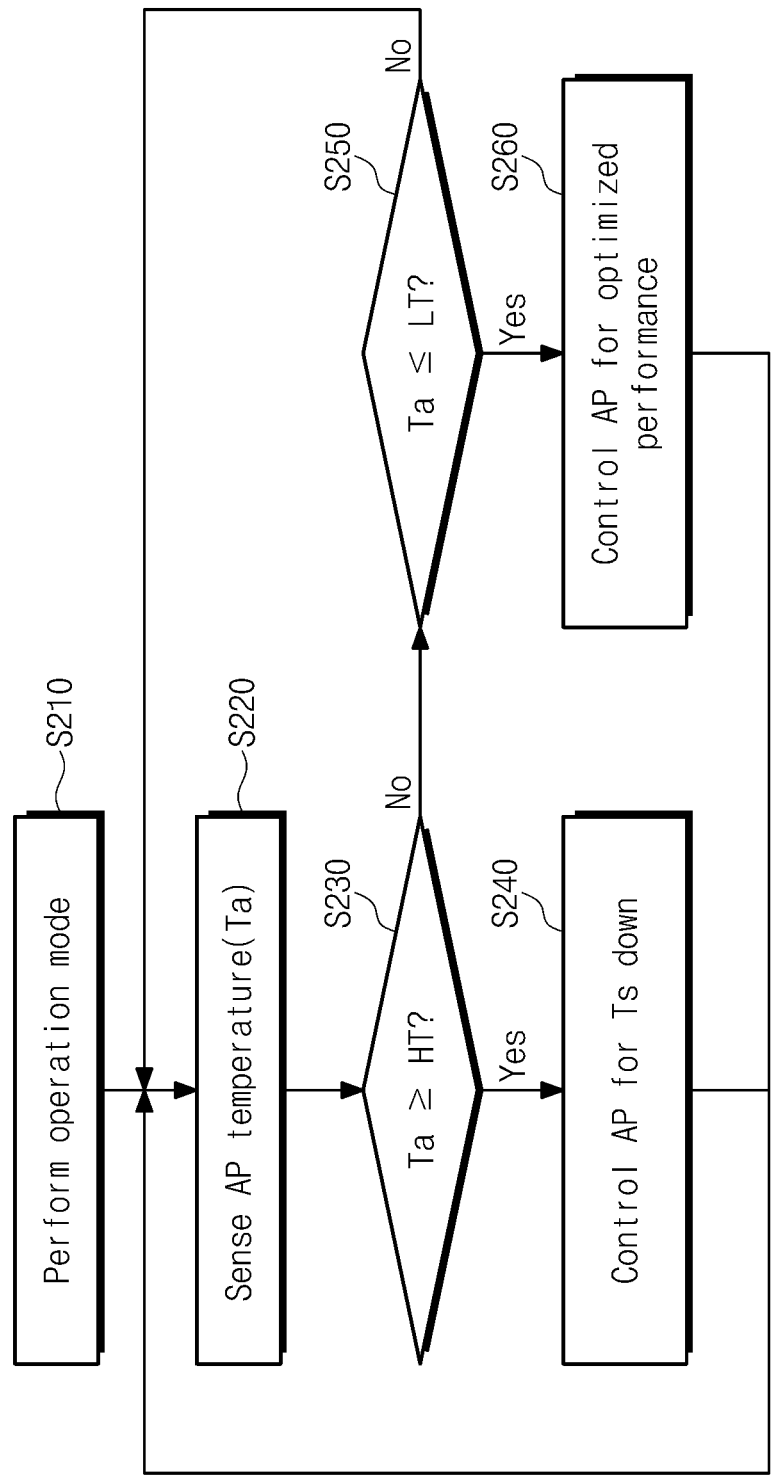
FIG. 5 is a flow chart illustrating a first exemplary embodiment of a method of managing a surface temperature of mobile device in accordance with some exemplary embodiments.

FIG. 5 is a flow chart illustrating a first exemplary embodiment of method of managing a surface temperature of mobile device 10 in accordance with some exemplary embodiments. Referring to FIGS. 1 through 5, a method of managing a surface temperature is as follows.

The mobile device 10 operates in a specific operation mode. The dynamic thermal management module 120 is activated. The dynamic thermal management module 120 may be activated simultaneously with a power supply of the mobile device 10. The dynamic thermal management module 120 may also be activated by a request of user. The dynamic thermal management module 120 may also be activated in response to a specific operation mode (S210).

The temperature measurement unit 130 of the AP 100 senses an AP temperature Ta in real time (S220). The temperature measurement unit 130 may be activated simultaneously with a power supply of the mobile device 10. The temperature measurement unit 130 may also be activated in response to an activation of the dynamic thermal management module 120.

The dynamic thermal management module 120 can manage a surface temperature Ts of target part in a specific operation mode by comparing the AP temperature Ta sensed in real time with the target temperatures (e.g., HT1, HT2 and LT). First, the dynamic thermal management module 120 distinguishes whether the AP temperature Ta is equal to or higher than the target temperature HT (S230).

If the AP temperature Ta is equal to or higher than the target temperature HT, the AP 100 is controlled to lower the surface temperature Ts of target part (S240). To lower the surface temperature Ts of target part, the AP operation frequency may be lowered and/or a frame rate may be lowered. If the AP temperature Ta is not equal to or not higher than the target temperature HT, the dynamic thermal management module 120 distinguishes whether the AP temperature Ta is lower than or equal to the target low temperature LT (S250).

If the AP temperature Ta is lower than or equal to the target low temperature LT, the AP 100 is controlled for optimized performance of specific operation mode (S260). For optimized performance of the specific operation mode, the AP operation frequency is increased and/or a frame rate is increased. After that, the operation returns to operation S220. If the AP temperature Ta is not lower than or not equal to the target low temperature LT, the operation returns to operation S220.

As described above, in the method of managing a surface temperature of the mobile device 10 in accordance with exemplary embodiments, the surface temperature Ts of target part in the specific operation mode may be managed by comparing the AP temperature sensed in real time with the target temperatures (HT1, HT2 and LT) of surface temperature management table.

Figure 6:
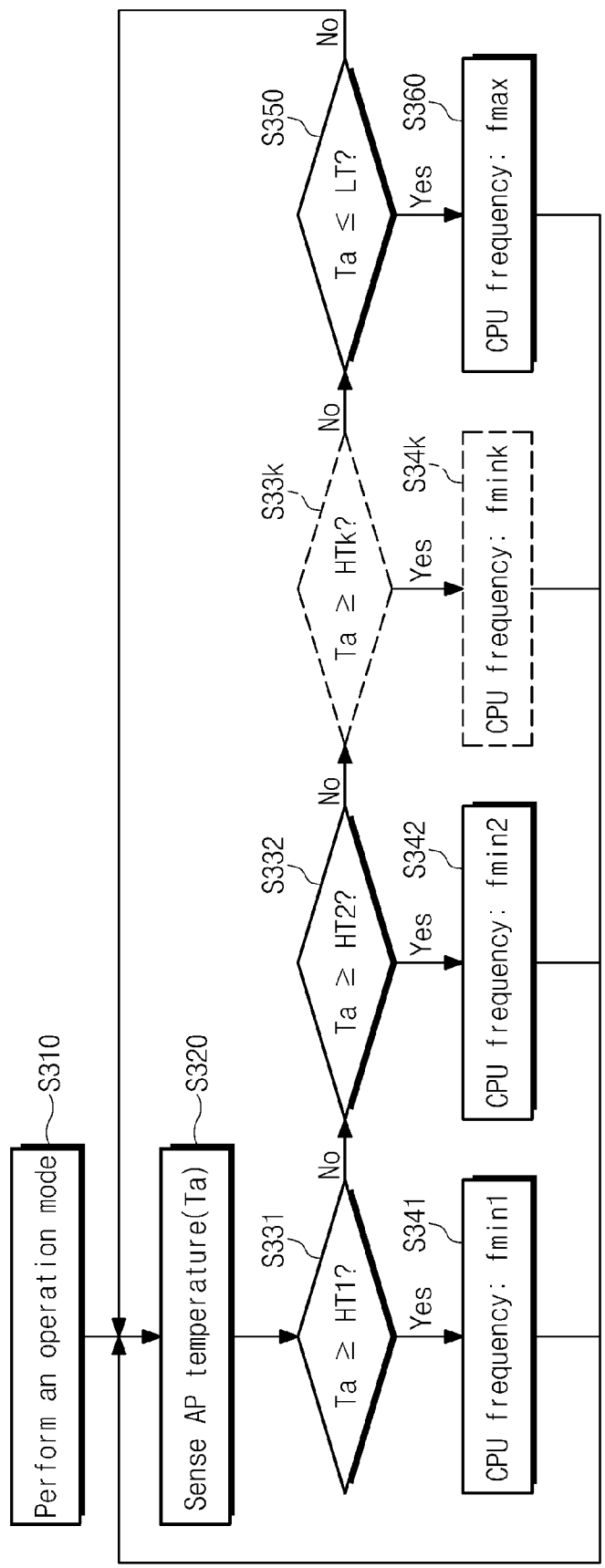
FIG. 6 is a flow chart illustrating a second exemplary embodiment of a method of managing a surface temperature of mobile device in accordance with some exemplary embodiments.

FIG. 6 is a flow chart illustrating a second exemplary embodiment of method of managing a surface temperature of mobile device in accordance with some exemplary embodiments. Referring to FIGS. 1 through 4 and 6, a method of managing a surface temperature is as follows.

The mobile device 10 operates in a specific operation mode. The dynamic thermal management module 120 is activated (S310). The temperature measurement unit 130 of the AP 100 senses an AP temperature Ta in real time (320).

The dynamic thermal management module 120 distinguishes whether the AP temperature Ta is equal to or higher than the first target high temperature HT1 (S331). If the AP temperature Ta is equal to or higher than the first target high temperature HT1, a CPU frequency of the AP 100 is set to a first minimum operation frequency (fmin1) to lower the surface temperature Ts of target part (S341). After that, the operation returns to operation S320.

If the AP temperature Ta is not equal to or not higher than the first target high temperature HT1, the dynamic thermal management module 120 distinguishes whether the AP temperature Ta is equal to or higher than the second target high temperature HT2 (S332). If the AP temperature Ta is equal to or higher than the second target high temperature HT2, a CPU frequency of the AP 100 is set to a second minimum operation frequency (fmin2) to lower the surface temperature Ts of target part. The second minimum operation frequency (fmin2) may be higher than the first minimum operation frequency (fmin1) (S342). After that, the operation returns to operation S320.

If the AP temperature Ta is not equal to or not higher than the second target high temperature HT2, the dynamic thermal management module 120 distinguishes whether the AP temperature Ta is equal to or higher than kth (k is an integer which is 3 or more) target high temperature (HTk) (S33k). If the AP temperature Ta is equal to or higher than the second target high temperature HT2, a CPU frequency of the AP 100 is set to a kth minimum operation frequency (fmink) to lower the surface temperature Ts of target part. The kth minimum operation frequency (fmink) may be higher than first through k−1th minimum frequencies (fmin1−fmin(k−1)) (S34k). After that, the operation returns to operation S320.

If the AP temperature Ta is not equal to or not higher than a kth target high temperature HTk, the dynamic thermal management module 120 distinguishes whether the AP temperature Ta is lower than or equal to the target low temperature LT (S350). If the AP temperature Ta is lower than or equal to the target low temperature LT, a CPU frequency of the AP 100 is set to a maximum operation frequency fmax to improve performance of the specific operation mode (S360). After that, the operation returns to operation S320. If the AP temperature Ta is not lower than or not equal to the target low temperature LT, the operation returns to operation S320.

As described above, in the method of managing a surface temperature of the mobile device 10, the surface temperature Ts of target part in the specific operation mode may be managed by stages by comparing the AP temperature sensed in real time with the target temperatures (HT1, HT2, . . . , HTk and LT) of surface temperature management table.

The temperature management unit 130 is included in the AP 100. However, the mobile device 10 in accordance with exemplary embodiments of the inventive concept is not limited thereto.

Figure 7:
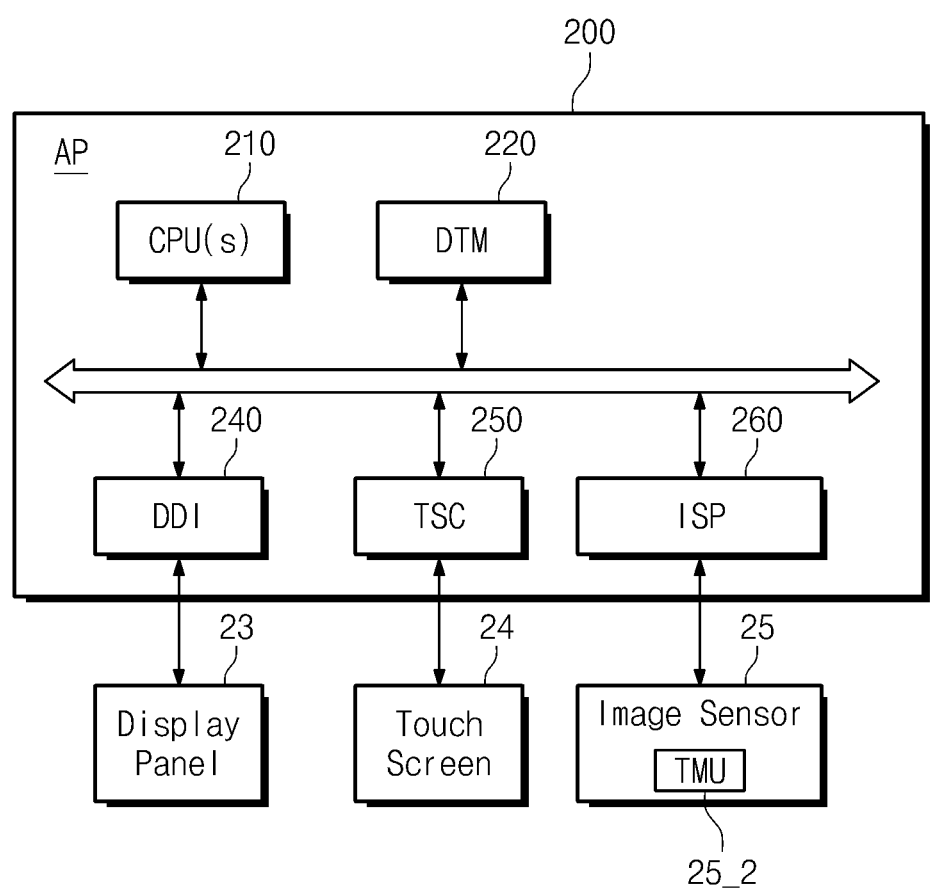
FIG. 7 is a second block diagram of mobile device for describing a method of managing a surface temperature in accordance with some exemplary embodiments.

FIG. 7 is a second block diagram of mobile device for describing a method of managing a surface temperature in accordance with some exemplary embodiments. Referring to FIG. 7, when comparing with the AP 100 illustrated in FIG. 2, the AP 200 does not include the temperature measurement unit 130 and the image sensor 25 includes a temperature measurement unit 25_2 instead.

The dynamic thermal management module 220 of the mobile device 10 manages a surface temperature of the mobile device 10 using a surface temperature management table corresponding to a temperature of the image sensor 25 sensed in real time.

FIG. 8 is a surface temperature management table used in the dynamic thermal management (DTM) module 220 illustrated in FIG. 7. Referring to FIG. 8, the surface temperature management table includes surface temperature information, surface area information, AP temperature information, image sensor temperature information and frame rate control information in accordance with an operation mode.

The operation mode includes a game, an image capturing, a web browsing and a video play.

The surface temperature information includes a reference surface temperature T1, T2 and T3 of a target part (e.g., the housing 11, the printed circuit board 12, the display panel 13, the touch screen 14, the image sensor 15, the window material 16 that are illustrated in FIG. 1) for managing a surface temperature Ts in the mobile device 10.

The surface area information is information relative to a surface area of target part for managing the surface temperature Ts.

The image sensor information includes target temperatures HT1, HT2 and LT corresponding to the reference surface temperatures T1, T2 and T3 according to an operation mode.

The frame rate control information includes information for increasing or decreasing a frame rate in response to the target temperatures HT1, HT2 and LT according to the operation mode.

The surface temperature management table includes the frame rate control information to manage a temperature using the target temperatures HT1, HT2 and LT corresponding to the reference surface temperatures T1, T2 and T3 according to an operation mode.

Figure 9:
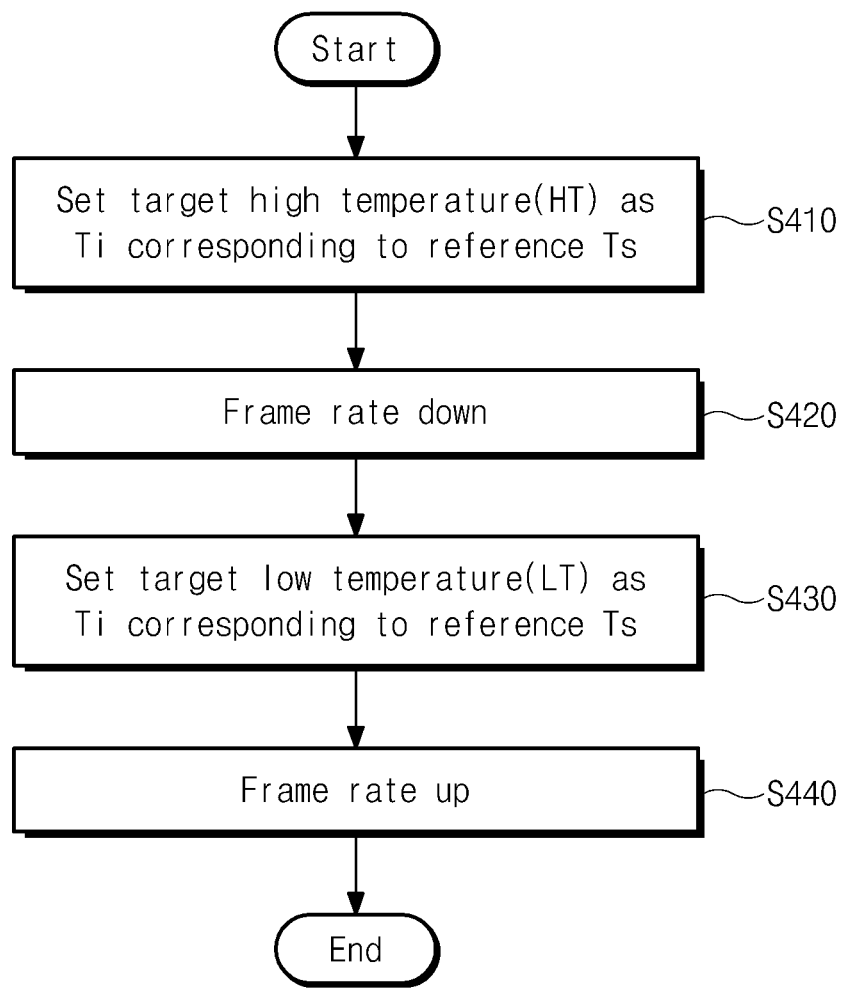
FIG. 9 is a flow chart illustrating a method of setting up the surface temperature management table illustrated in FIG. 8.

FIG. 9 is a flow chart illustrating a method of setting up the surface temperature management table illustrated in FIG. 8 in an engineering step. Referring to FIGS. 8 and 9, a method of setting up the surface temperature management table is as follows.

The mobile device 10 is operated in a specific operation mode. At this time, a surface temperature Ts of target part corresponding to the operation mode is sensed. An image sensor temperature Ti corresponding to the sensed reference surface temperature Ts is sensed. The sensed image sensor temperature Ti is set as the target high temperature HT corresponding to the reference surface temperature Ts in a specific operation mode (S410).

After that, when the image sensor temperature Ti becomes the target high temperature HT in the specific operation mode, a frame rate is reduced to reduce the surface temperature Ts of target part (S420). Since the mobile device 10 operates in a state that a frame rate is lowered, the surface temperature Ts of target part becomes low. By repeating the S420, when the image sensor temperature Ti becomes the target high temperature HT in the specific operation mode, frame rate control information for lowering the surface temperature Ts of target part is set. The frame rate control information may include information for lowering a frame rate by stages in the specific operation mode according to the target high temperature HT. The frame rate control information may also include information for lowering a frame rate rapidly in the specific operation mode according to the target high temperature HT.

If the frame rate becomes low, the image sensor temperature Ti is lowered and the surface temperature Ts of target part is also lowered. If the surface temperature Ts of target part is lowered to a reference value, the frame rate may be increased again to improve performance of the specific operation mode. When the surface temperature Ts of target part in the specific operation mode is a reference value, the image sensor temperature Ti is sensed. The sensed image sensor temperature Ti is set as the target low temperature LT corresponding to the reference surface temperature Ts in the specific operation mode (S430).

After that, when the image sensor temperature Ti becomes the target low temperature LT in the specific operation mode, the frame rate is increased to improve performance of the specific operation mode (S440). Performance of the specific operation mode of the mobile device 10 may be improved by increasing the frame rate again. By repeating the S440, when the image sensor temperature Ti becomes the target low temperature LT in the specific operation mode, the frame rate control information to improve performance of the specific operation mode is set up. The frame rate control information may include information to increase the frame rate rapidly according to the target low temperature LT in the specific operation mode. Also, the frame rate control information may include information to increase the frame rate by stages according to the target low temperature LT in the specific operation mode.

The frame rate control information may include information to lower the surface temperature Ts of target part in the specific operation mode and information to improve performance of the specific operation mode.

Figure 10:
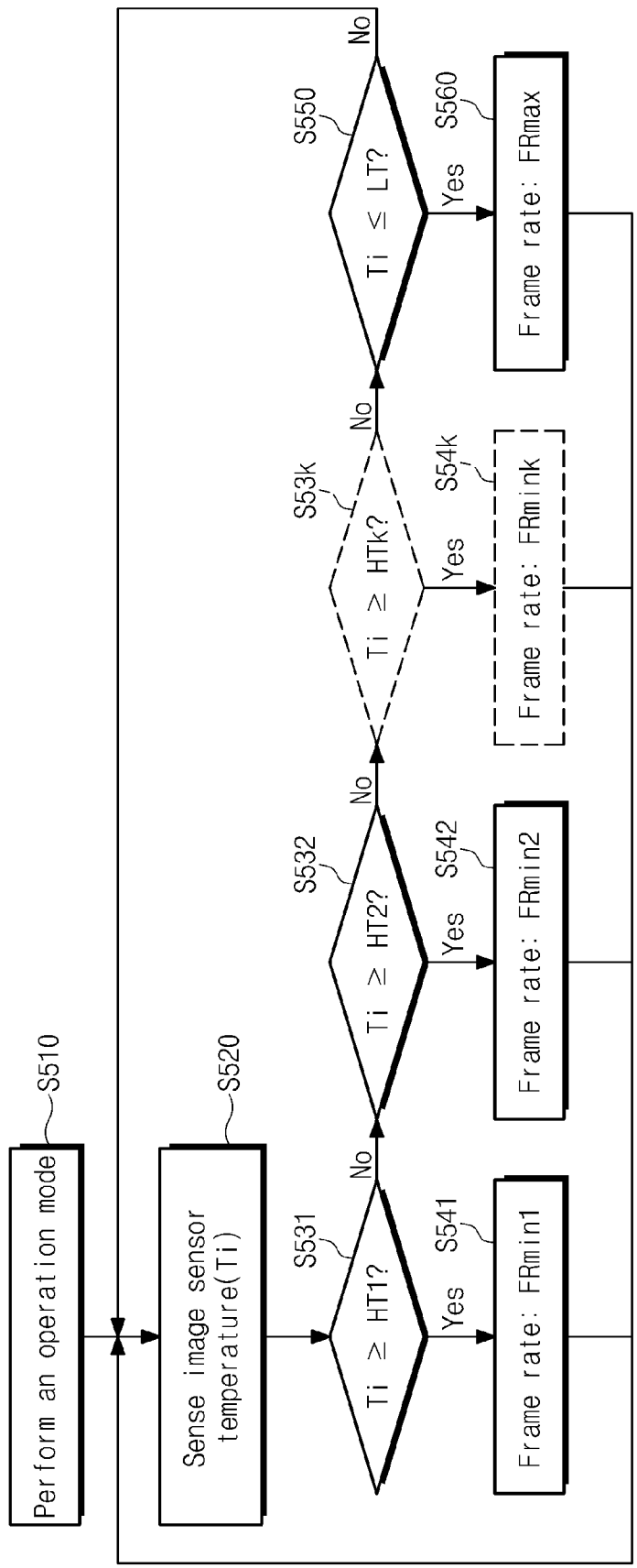
FIG. 10 is a flow chart illustrating a third exemplary embodiment of a method of managing a surface temperature of mobile device in accordance with some exemplary embodiments.

FIG. 10 is a flow chart illustrating a third exemplary embodiment of method of managing a surface temperature of mobile device in accordance with some exemplary embodiments. Referring to FIGS. 1 and 7 through 10, the method of managing the surface temperature is as follows.

The mobile device 10 operates in a specific operation mode. The dynamic thermal management module 220 is activated (S510). The temperature measurement unit 25_2 of the image sensor 25 senses an image sensor temperature Ti in real time (S520).

The dynamic thermal management module 220 distinguishes whether the image sensor temperature Ti is equal to or higher than the first target high temperature HT1 (S531). If the image sensor temperature Ti is equal to or higher than the first target high temperature HT1, a frame rate is set to a first minimum frame rate (FRmin1) to lower the surface temperature Ts of target part (S541). After that, the operation returns to operation S520.

If the image sensor temperature Ti is not equal to or not higher than the first target high temperature HT1, the dynamic thermal management module 220 distinguishes whether the image sensor temperature Ti is equal to or higher than the second target high temperature HT2 (S532). If the image sensor temperature Ti is equal to or higher than the second target high temperature HT2, a frame rate is set to a second minimum frame rate (FRmin2) to lower the surface temperature Ts of target part. The second minimum frame rate (FRmin2) is higher than the first minimum frame rate (FRmin1) (S542). After that, the operation returns to operation S520.

If the image sensor temperature Ti is not equal to or not higher than the second target high temperature HT2, the dynamic thermal management module 220 distinguishes whether the image sensor temperature Ti is equal to or higher than kth (k is an integer which is 3 or more) target high temperature (HTk) (S53$k$). If the image sensor temperature Ti is equal to or higher than the second target high temperature HT2, a frame rate is set to a kth minimum frame rate (FRmink) to lower the surface temperature Ts of target part. The kth minimum frame rate (FRmink) is higher than first through k−1th minimum frame rates (FRmin1–FRmin(k−1)) (S54$k$). After that, the operation returns to operation S520.

If the image sensor temperature Ti is not equal to or not higher than a kth target high temperature HTk, the dynamic thermal management module 220 distinguishes whether the image sensor temperature Ti is lower than or equal to the target low temperature LT (S550). If the image sensor temperature Ti is lower than or equal to the target low temperature LT, a frame rate is set to a maximum frame rate FRmax to improve performance of the specific operation mode (S560). After that, the operation returns to operation S520. If the image sensor temperature Ti is not lower than or equal to the target low temperature LT, the operation returns to operation S520.

As described above, in the method of managing a surface temperature of the mobile device 10, the surface temperature Ts of target part in the specific operation mode may be managed by stages by comparing the image sensor temperature Ti sensed in real time with the target temperatures (HT1, HT2, . . . , HTk and LT) of surface temperature management table.

Figure 11:
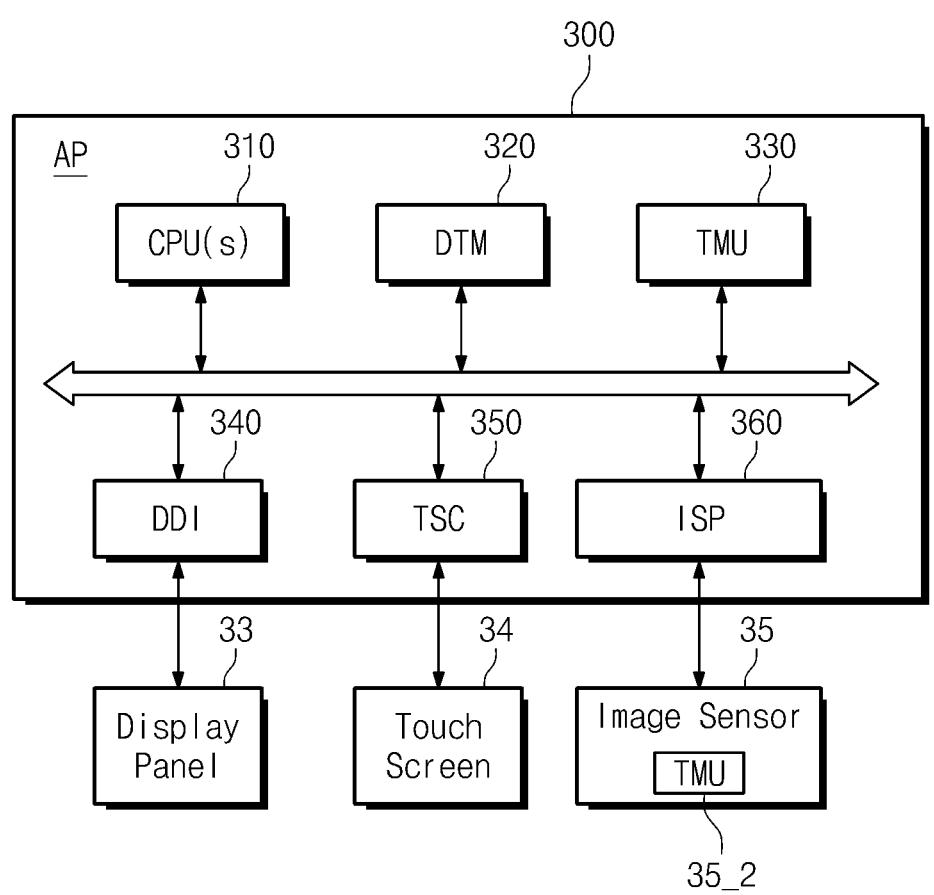
FIG. 11 is a third block diagram of mobile device for describing a method of managing a surface temperature in accordance with some exemplary embodiments.

Additionally, in the mobile device 10 in accordance with exemplary embodiments, both the AP and the image sensor may include the temperature measurement unit, as shown in FIG. 11.

FIG. 11 is a third block diagram of mobile device for describing a method of managing a surface temperature in accordance with some exemplary embodiments. Referring to FIG. 11, an AP 300 includes a temperature measurement unit 330 and an image sensor includes a temperature measurement unit 35_2.

A dynamic thermal management module 320 of the mobile device 10 may manage a surface temperature of the mobile device 10 using an AP temperature sensed in real time and a surface temperature management table corresponding to a temperature of the image sensor 25.

FIG. 12 is a surface temperature management table used in the dynamic thermal management (DTM) module illustrated in FIG. 11. Referring to FIG. 12, the surface temperature management table includes surface temperature information, surface area information, AP temperature information, AP operation frequency control information, image sensor temperature information and frame rate control information in accordance with an operation mode.

The AP temperature information includes target temperatures HT1, HT2 and LT corresponding to reference surface temperatures T1, T2 and T3 according to an operation mode.

The AP operation frequency control information includes information for increasing or decreasing an AP operation frequency in response to the target temperatures HT1, HT2 and LT according to an operation mode.

The image sensor information includes target temperatures HT1, HT2 and LT corresponding to reference surface temperatures T1, T2 and T3 according to an operation mode.

The frame rate information for increasing or decreasing a frame rate in response to the target temperatures HT1, HT2 and LT according to an operation mode.

The surface temperature management table includes the AP operation frequency control information controlling an AP operation frequency according to a relation between an AP temperature Ta and the target temperatures HT1, HT2 and LT to manage a surface temperature of target part according to an operation mode and the frame rate control information controlling a frame rate according to a relation between an image sensor temperature Ti and the target temperatures HT1, HT2 and LT.

Figure 13:
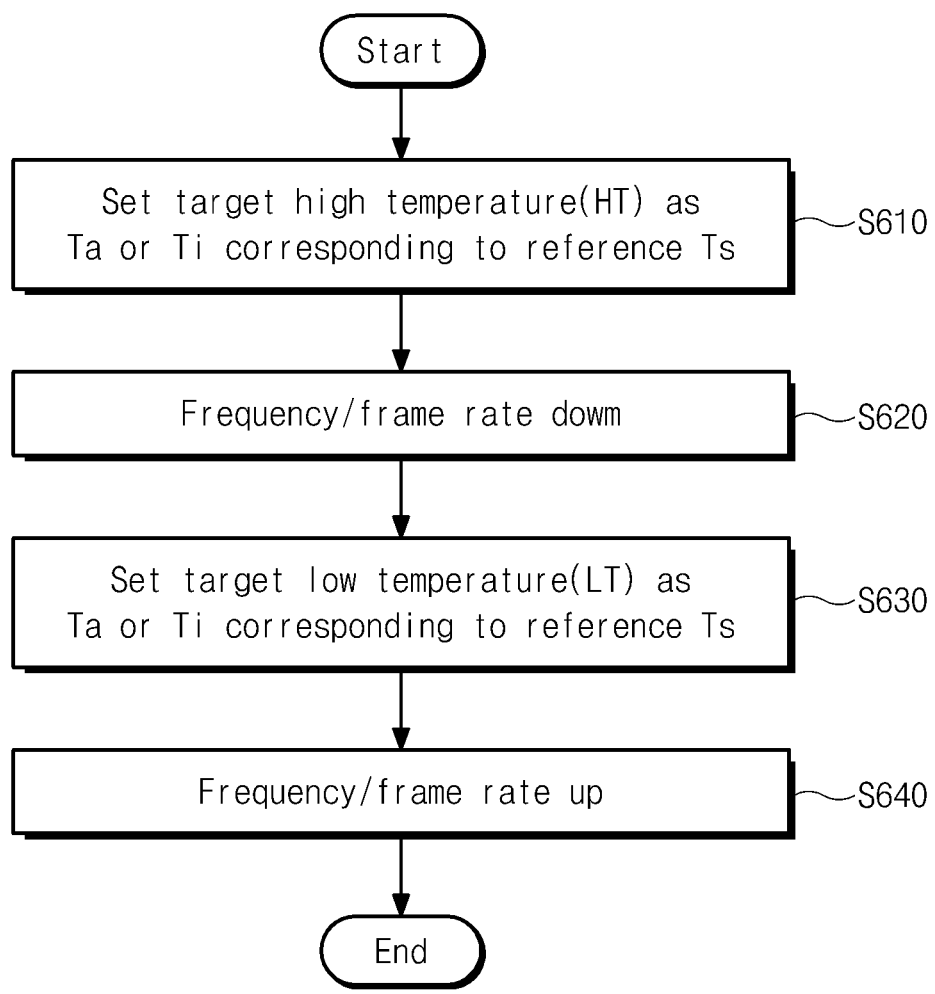
FIG. 13 is a flow chart illustrating a method of setting up the surface temperature management table illustrated in FIG. 12.

FIG. 13 is a flow chart illustrating a method of setting up the surface temperature management table illustrated in FIG. 12 in an engineering step. Referring to FIGS. 12 and 13, the method of setting up the surface temperature management table is as follows.

The mobile device 10 operates in a specific operation mode. At this time, a surface temperature Ts of target part corresponding to the operation mode is sensed. An AP temperature Ta or an image sensor temperature Ti corresponding to the sensed reference surface temperature Ts is sensed. The sensed AP temperature Ta and the sensed image sensor temperature Ti are set as a target high temperature HT corresponding to the reference surface temperature Ts in the specific operation mode (S610).

After that, when the AP temperature Ta or the image sensor temperature Ti become the target high temperature HT in the specific operation mode, an AP operation frequency or a frame rate is reduced to reduce the surface temperature Ts of target part (S620). Since the mobile device 10 operates in a state that an AP operation frequency or a frame rate is lowered, the surface temperature Ts of target part becomes low. By repeating the S620, when the AP temperature Ta or the image sensor temperature Ti become the target high temperature HT in the specific operation mode, AP operation frequency control information and frame rate control information for lowering the surface temperature Ts of target part are set.

If AP operation frequency control information or a frame rate is lowered, an AP temperature Ta or an image sensor temperature Ti is lowered and a surface temperature Ts of target part is lowered. If the surface temperature Ts of target part is lowered to a target value, the AP operation frequency control information or the frame rate may be increased again to improve performance of the specific operation mode. When the surface temperature Ts of target part is a target value, the AP temperature Ta or the image sensor temperature Ti are sensed. The sensed AP temperature Ta or the sensed image sensor temperature Ti is set as the target low temperature LT corresponding to the reference surface temperature Ts in a specific operation mode (S630).

After that, when the AP temperature Ta or the image sensor temperature Ti becomes the target low temperature LT in a specific operation mode, the AP operation frequency or the frame rate is increased to improve performance of the specific operation mode. Performance of the specific operation mode of the mobile device 10 may be improved by increasing the AP operation frequency or the frame rate (S640). By repeating the S640, when the AP temperature Ta or the image sensor temperature Ti becomes the target low temperature LT, the AP operation frequency control information or the frame rate for improving performance of the specific operation mode is set.

The frame rate control information may be used in preference to the AP operation frequency control information to manage the surface temperature Ts of target part in the specific operation mode.

Also, the AP operation frequency control information may be used in preference to the frame rate control information to manage the surface temperature Ts of target part in the specific operation mode.

The AP operation frequency control information or the frame rate control information includes information to lower the surface temperature Ts of target part in the specific operation mode and information to improve performance of the specific operation mode.

Figure 14:
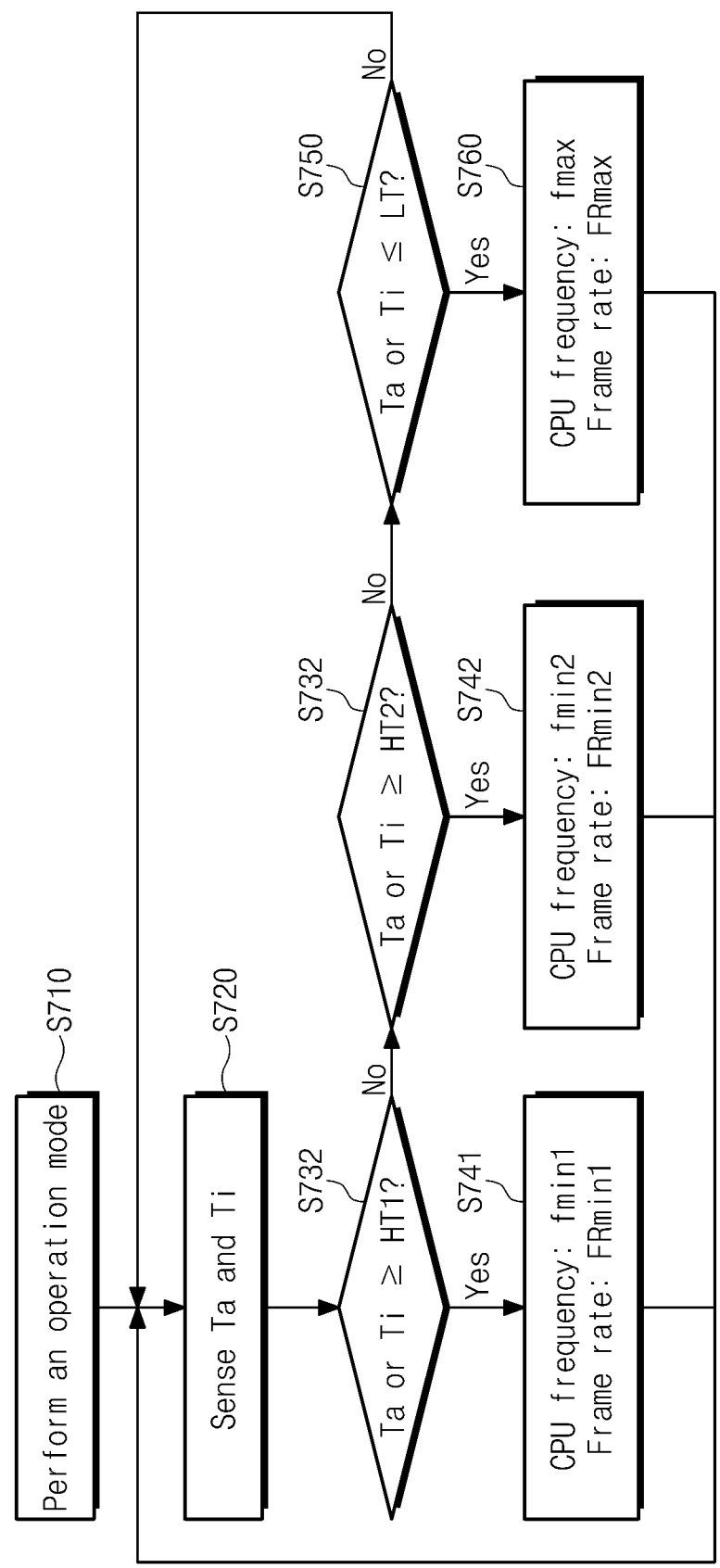
FIG. 14 is a flow chart illustrating a fourth exemplary embodiment of a method of managing a surface temperature of mobile device in accordance with some exemplary embodiments.

FIG. 14 is a flow chart illustrating a fourth exemplary embodiment of method of managing a surface temperature of mobile device in accordance with some exemplary embodiments. Referring to FIGS. 1 and 11 through 14, the method of manage a surface temperature is as follows.

The mobile device 10 operates in a specific operation mode. The dynamic thermal management module 320 is activated (S710). The temperature measurement unit 330 of the AP 100 and the temperature measurement unit 35_2 of the image sensor 35 sense an AP temperature Ta and an image sensor temperature Ti in real time (S720).

The dynamic thermal management module 320 distinguishes whether the AP temperature Ta or the image sensor temperature Ti is equal to or higher than the first target high temperature HT1 (S732). If the AP temperature Ta or the image sensor temperature Ti is equal to or higher than the first target high temperature HT1, a CPU frequency is set to a first minimum operation frequency min1 or a frame rate is set to a first minimum frame rate (FRmin1) to lower the surface temperature Ts of target part (S741). After that, the operation returns to operation S720.

If the AP temperature Ta or the image sensor temperature Ti is not equal to or not higher than the first target high temperature HT1, the dynamic thermal management module 320 distinguishes whether the AP temperature Ta or the image sensor temperature Ti is equal to or higher than the second target high temperature HT2 (S732). If the AP temperature Ta or the image sensor temperature Ti is equal to or higher than the second target high temperature HT2, a CPU frequency is set to a second minimum operation frequency min2 or a frame rate is set to a second minimum frame rate (FRmin2) to lower the surface temperature Ts of target part (S742). After that, the operation returns to operation S720.

If the AP temperature Ta or the image sensor temperature Ti is not equal to or not higher than the second target high temperature HT2, the dynamic thermal management module 320 distinguishes whether the AP temperature Ta or the image sensor temperature Ti is lower than or equal to the target low temperature LT (S750). If the AP temperature Ta or the image sensor temperature Ti is lower than or equal to the target low temperature LT, a CPU frequency is set to a maximum operation frequency fmax or a frame rate is set to a maximum frame rate FRmax to improve performance of the specific operation mode (S760). After that, the operation returns to operation S720. If the AP temperature Ta or the image sensor temperature Ti is not lower than or not equal to the target low temperature LT, the operation returns to operation S720.

As described above, in the method of managing a surface temperature of the mobile device 10, the surface temperature Ts of target part in the specific operation mode may be managed by stages by comparing the AP temperature Ta or the image sensor temperature Ti sensed in real time with the target temperatures (HT1, HT2 and LT) of surface temperature management table.

In the mobile device 10 in accordance with exemplary embodiments, both the AP and the display panel include the temperature measurement units.

Figure 15:
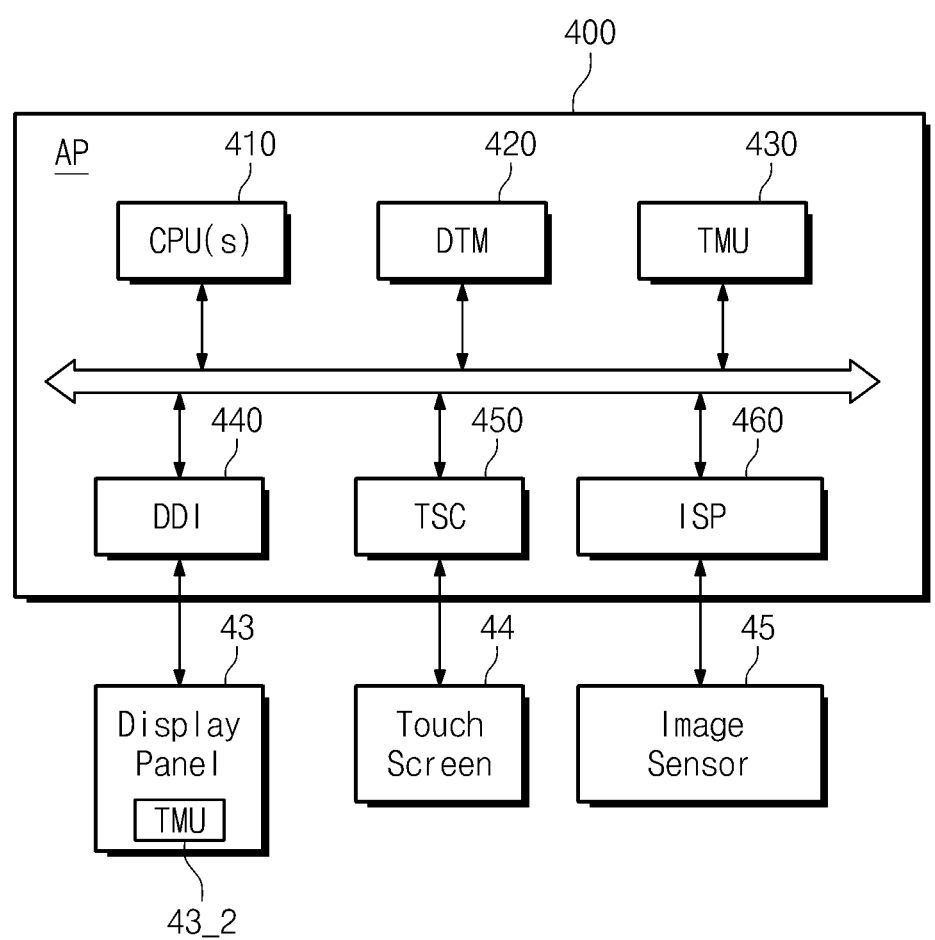
FIG. 15 is a fourth block diagram of mobile device for describing a method of managing a surface temperature in accordance with some exemplary embodiments.

FIG. 15 is a fourth block diagram of a mobile device for describing a method of managing a surface temperature in accordance with some exemplary embodiments. Referring to FIG. 15, the AP 400 includes a temperature measurement unit 430 and a display panel 43 includes a temperature measurement unit 43_2.

A dynamic thermal management module 420 of the mobile device 10 in accordance with some exemplary embodiments may manage a surface temperature of the mobile device 10 using an AP temperature sensed in real time and a surface temperature management table corresponding to a temperature of the display panel 43.

In the mobile device 10, the AP 400 and the display panel 43 may include temperature measurement units.

Figure 16:
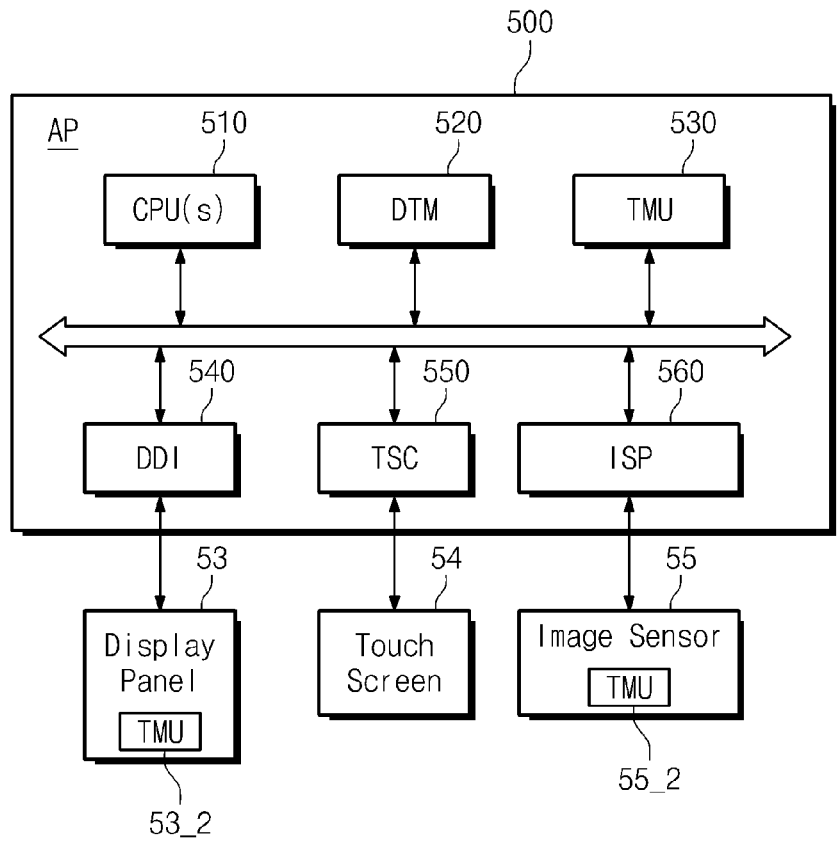
FIG. 16 is a fifth block diagram of mobile device for describing a method of managing a surface temperature in accordance with some exemplary embodiments.

FIG. 16 is a fifth block diagram of a mobile device for describing a method of managing a surface temperature in accordance with some exemplary embodiments. Referring to FIG. 16, the AP 500 includes a temperature measurement unit 530, a display panel 53 includes a temperature measurement unit 53_2, and an image sensor 55 includes a temperature measurement unit 55_2.

A dynamic thermal management module 520 of the mobile device 10 in accordance with some exemplary embodiments may manage a surface temperature of the mobile device 10 using an AP temperature sensed in real time, a temperature of the display panel 53 and a surface temperature management table corresponding to a temperature of the image sensor 55.

Memory Thermal Management of Multichip Package

Figure 17:
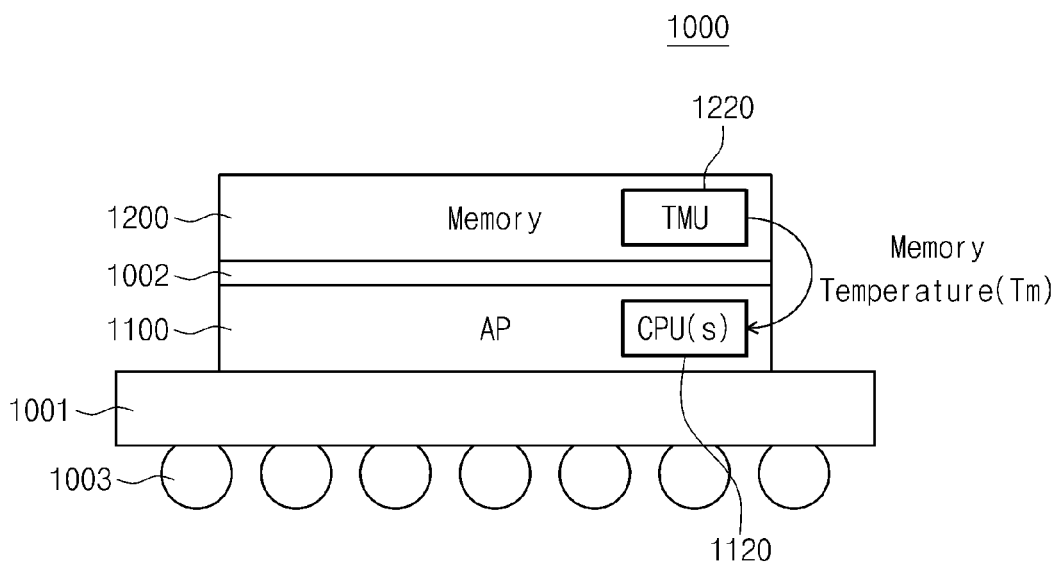
FIG. 17 is a drawing conceptually illustrating a memory thermal management method of multichip package in accordance with some exemplary embodiments.

FIG. 17 is a drawing conceptually illustrating a memory thermal management method of multichip package in accordance with some exemplary embodiments. Referring to FIG. 17, a multichip package 1000 has a structure such that an AP 1100 and a memory 1200 are sequentially stacked on a circuit board 1001. A spacer 1002 may be included between the AP 1100 and the memory 1200. Connection bumps 1003 for connecting the multichip package 1000 to a main circuit board may be provided on a lower portion of the circuit board 1001.

The AP 1100 is a processor to perform an application and may include at least one central processing unit 1120. The central processing unit 1120 controls the whole operation.

The central processing unit 1120 controls the AP 1100 on the basis of a memory temperature Tm for a thermal management of the memory 1200. For example, the central processing unit 1120 may lower an operation frequency of the AP 1100 to lower the memory temperature Tm. Since the multichip package 1000 has a structure such that the AP 1100 and the memory 1200 are stacked, heat generated from the AP 1100 may be transferred to the memory 1200. Thus, if a temperature of the AP 1100 is lowered by lowering an operation frequency of the AP 1100, the memory temperature Tm may also be lowered.

The memory 1200 is a storage device to store data needed to perform an application. The memory 1200 may be any kind of memory to store a volatile memory (e.g., a DRAM and SRAM), a nonvolatile memory (e.g., NAND, NOR, PRAM, FRAM, RRAM) or a fusion memory (e.g., oneNAND, oneDRAM).

The memory 1200 includes a temperature measurement unit 1220 for measuring the memory temperature Tm. The temperature measurement unit 1220 can sense a junction temperature of the memory 1200.

The temperature measurement unit 1220 senses the memory temperature Tm in real time and may transfer the sensed memory temperature Tm to the central processing unit 1120.

The temperature measurement unit 1220 senses the memory temperature Tm in response to a temperature measurement execution of the central processing unit 1120 and may transfer the sensed memory temperature Tm to the central processing unit 1120.

The multichip package is described in detail in U.S. Patent Application Publication No. 2011-0013353 of Samsung Electronics Co., Ltd., the contents of which are herein incorporated by reference.

The multichip package 1000 controls the AP 1100 on the basis of the sensed memory temperature Tm to manage the heat of the memory.

Figure 18:
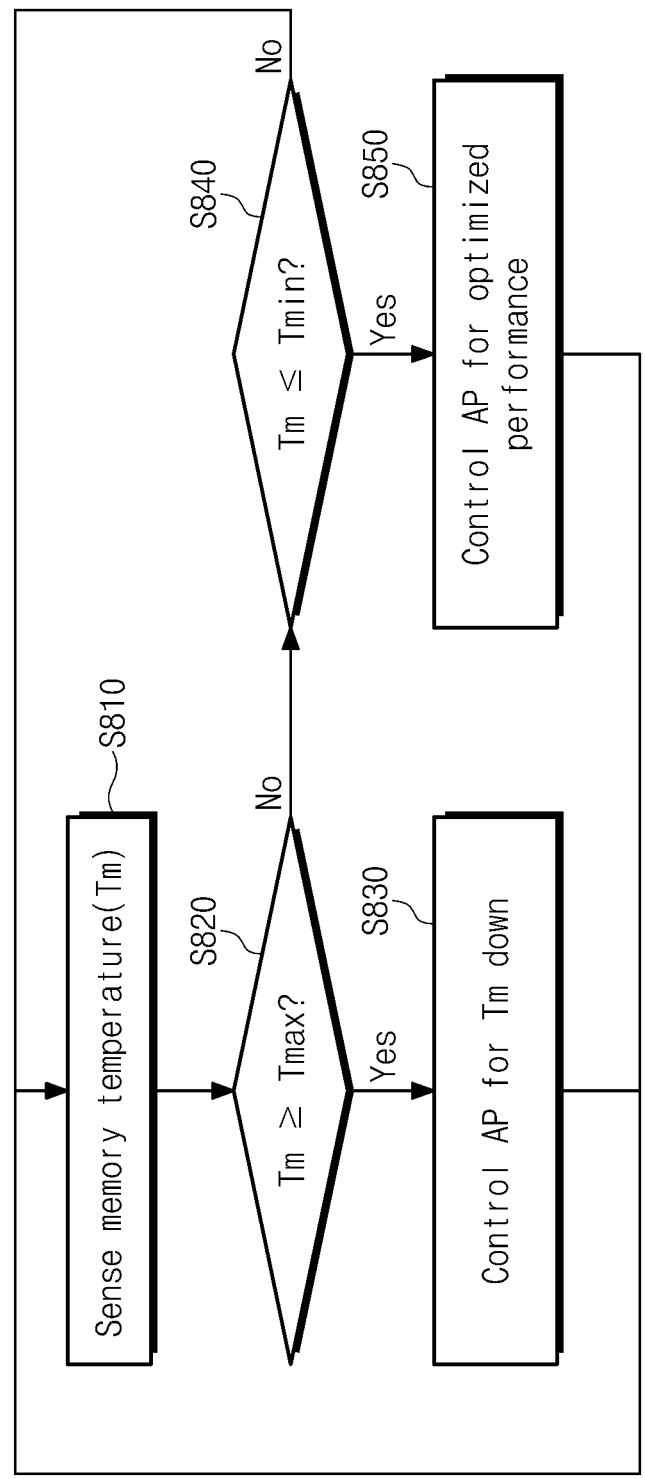
FIG. 18 is a flow chart illustrating a memory thermal management method of multichip package in accordance with some exemplary embodiments.

FIG. 18 is a flow chart illustrating a memory thermal management method of multichip package in accordance with some exemplary embodiments. Referring to FIGS. 17 and 18, the memory thermal management method is as follows.

A temperature Tm of the memory 1200 of the multichip package 1000 is sensed (S810). The memory temperature Tm may be sensed in real time by the temperature measurement unit 1220 of the memory 1200. The memory temperature Tm may be sensed by the temperature measurement unit 1220 of the memory 1200 in response to a request of the central processing unit 1120. The request of the central processing unit 1120 with respect to sensing of the memory temperature Tm may be performed in response to a thermal management request of the memory 1200 by a user. Also, the request of the central processing unit 1120 with respect to sensing of the memory temperature Tm may be performed in response to a power supply of the multichip package 1000.

The central processing unit 1120 distinguishes whether the sensed memory temperature Tm is higher than or equal to a maximum temperature Tmax (S820). The distinguishing operation may be performed by a memory thermal management algorithm. That is, the central processing unit 1120 may perform the distinguishing operation using the memory thermal management algorithm.

If the memory temperature Tm is higher than or equal to the maximum temperature Tmax, the AP 1100 is controlled to lower the memory temperature Tm (S830). A temperature (non-target temperature) of the AP 1100 is lowered to lower the memory temperature Tm (or target temperature). Since a temperature generated from the AP 1100 is transferred to the memory 1200, if lowering a temperature of the AP 1100, the memory temperature Tm is lowered. After that, operation proceeds to operation S810.

If the memory temperature Tm is not higher than or not equal to the maximum temperature Tmax, the central processing unit 1120 distinguishes whether the memory temperature Tm is lower than or equal to a minimum temperature Tmin (S840).

If the memory temperature Tm is lower than or equal to the minimum temperature Tmin, the AP 1100 is controlled for optimized performance (S850). If a frequency of the AP 1100 is lowered to lower the memory temperature Tm in the previous operation, a frequency of the AP 1100 in the present operation will be returned to an original operation. After that, operation proceeds to operation S850. If the memory temperature Tm is not lower than or equal to the minimum temperature Tmin, operation proceeds to operation S850.

As described above, in the memory thermal management method of the multichip package 1000, the memory temperature Tm is sensed and the sensed memory temperature Tm is compared with the temperatures Tmax and Tmin to control the AP 1100, thereby the memory temperature Tm is managed.

Figure 19:
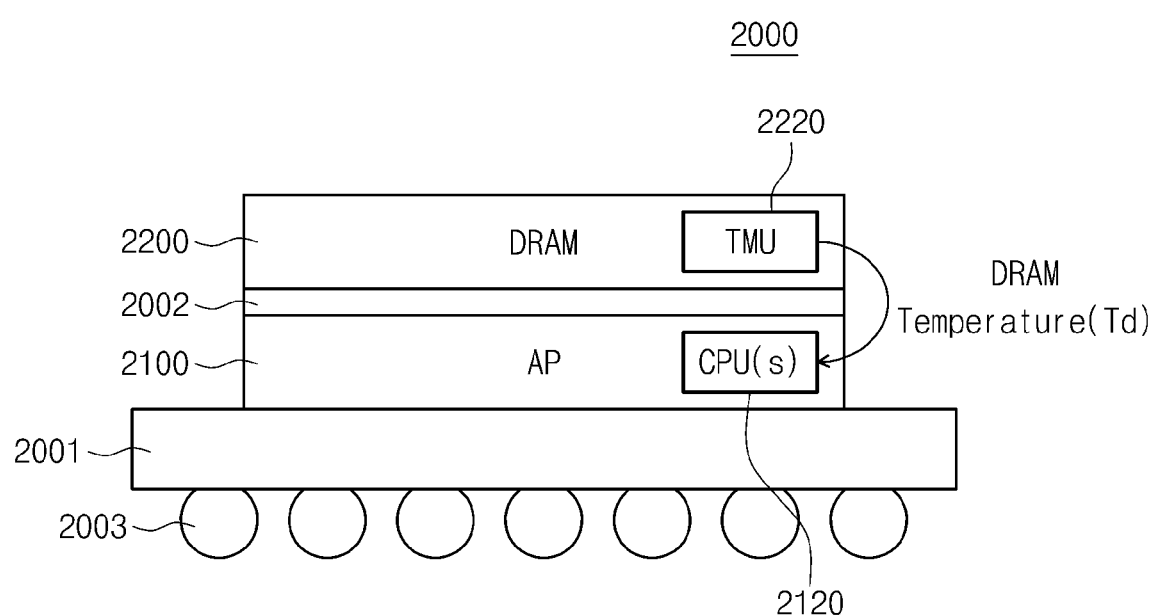
FIG. 19 is a drawing illustrating a first exemplary embodiment of multichip package in accordance with some exemplary embodiments.

FIG. 19 is a drawing illustrating a first exemplary embodiment of a multichip package. Referring to FIG. 19, the multichip package 2000 has a structure such that an AP 2100 and a DRAM 2200 are sequentially stacked on a circuit board 2001.

The multichip package 2000 manages heat of the DRAM 2200 by sensing a DRAM temperature Td and controlling the AP 2100 on the basis of the sensed the DRAM temperature Td. A control target of the AP 2100 may be a refresh rate of the DRAM 2200 or an operation frequency of a central processing unit 2120.

Temperature data corresponding to the sensed DRAM temperature Td may be transferred to the central processing unit 2120 using at least one TQ pin of the DRAM 2200. The temperature data is data corresponding to a temperature range for managing the DRAM temperature Td. For example, when the DRAM temperature Td is about 105° C. or higher, the temperature data (e.g., '1') may be transferred to the central processing unit 2120 through one TQ pin. Also, when the DRAM temperature Td is higher than about 85° C. and lower than about 95° C., the temperature data (e.g., '10') may be transferred to the central processing unit 2120 through two TQ pins, and when the DRAM temperature Td is higher than about 95° C. and lower than about 105° C., the temperature data (e.g., '11') may be transferred to the central processing unit 2120 through two TQ pins. It is noted that these temperature values and TQ line values are merely exemplary, and alternate ranges and representation schemes may be selected.

The temperature data corresponding to the sensed DRAM temperature Td may be transferred to the central processing unit 2120 using a CA pin interface of the DRAM 2200. Using the CA pin interface includes receiving a temperature sensing execution from the central processing unit 2120 of the DRAM 2200 to transmit the temperature data corresponding to the DRAM temperature Td sensed by a temperature measurement unit 2220 to the central processing unit 2120. In this case, since the temperature data is transmitted through data pins, a management range of the DRAM temperature Td may easily extend to several sections.

Figure 20:
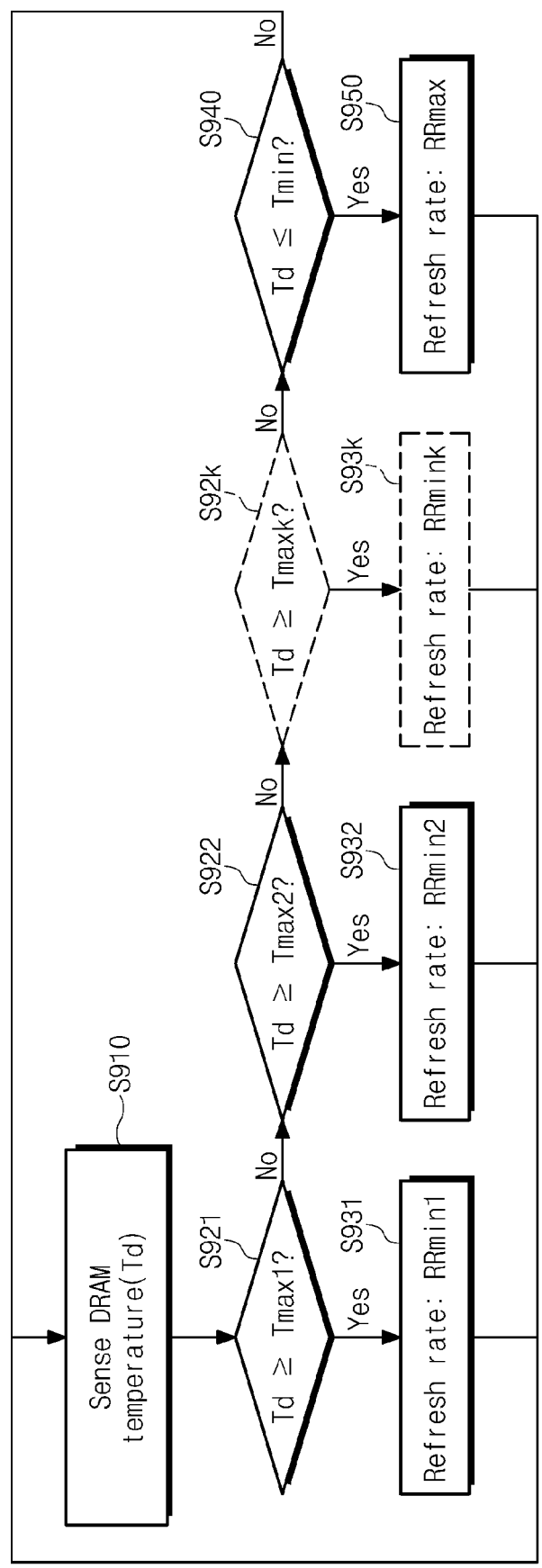
FIG. 20 is a flow chart illustrating a first exemplary embodiment of Dynamic Random Access Memory (DRAM) thermal management method in the multichip package illustrated in FIG. 19.

FIG. 20 is a flow chart illustrating a first exemplary embodiment of a DRAM thermal management method in the multichip package illustrated in FIG. 19. Referring to FIGS. 19 and 20, the DRAM thermal management method is as follows.

The temperature measurement unit 2220 of the DRAM 2200 senses the DRAM temperature Td in response to a request from the outside of the multichip package or when a power is supplied and transfers the sensed DRAM temperature Td to the central processing device 2120 of the AP 2100 (S910).

The central processing unit 2120 distinguishes whether the DRAM temperature Td is equal to or higher than a first maximum temperature Tmax1 (S921). If the DRAM temperature Td is equal to or higher than the first maximum temperature Tmax1, a refresh rate of the DRAM 2200 is set to the first minimum refresh rate RRmin1 to lower the DRAM temperature Td (S931). After that, operation proceeds to operation S910.

If the DRAM temperature Td is not equal to or higher than the first maximum temperature Tmax1, the central processing unit 2120 distinguishes whether the DRAM temperature Td is equal to or higher than the second maximum temperature Tmax2 (S922). If the DRAM temperature Td is equal to or higher than the second maximum temperature Tmax2, a refresh rate of the DRAM 2200 is set to the second minimum refresh rate RRmin2 to lower the DRAM temperature Td (S932). The second minimum refresh rate RRmin2 is higher than the first minimum refresh rate RRmin1. After that, operation proceeds to operation S910.

If the DRAM temperature Td is not equal to or higher than the second maximum temperature Tmax2, the central processing unit 2120 distinguishes whether the DRAM temperature Td is equal to or higher than a kth maximum temperature Tmaxk (k is an integer which is 3 or more) (S92k). If the DRAM temperature Td is equal to or higher than the kth maximum temperature Tmaxk, a refresh rate of the DRAM 2200 is set to the kth minimum refresh rate RRmink to lower the DRAM temperature Td (S93k). The kth minimum refresh rate RRmink is higher than the second minimum refresh rate (RRmin2). After that, operation proceeds to operation S910. The operation S92k may be omitted or a plurality of operations for more precisely controlling the minimum refresh rate may be further included.

If the DRAM temperature Td is not equal to or higher than the kth maximum temperature Tmaxk, the central processing unit 2120 distinguishes whether the DRAM temperature Td is equal to or lower than a minimum temperature Tmin (S940). If the DRAM temperature Td is equal to or lower than the minimum temperature Tmin, a refresh rate RR is set to the maximum refresh rate RRmax to improve performance (S950). After that, operation proceeds to operation S910. If the DRAM temperature Td is not equal to or lower than the minimum temperature Tmin, operation proceeds to operation S910.

As described above, in the DRAM thermal management method of the multichip package 2000, refresh rates of the DRAM 2200 are controlled in stages by comparing the sensed DRAM temperature Td with the threshold temperatures.

Figure 21:
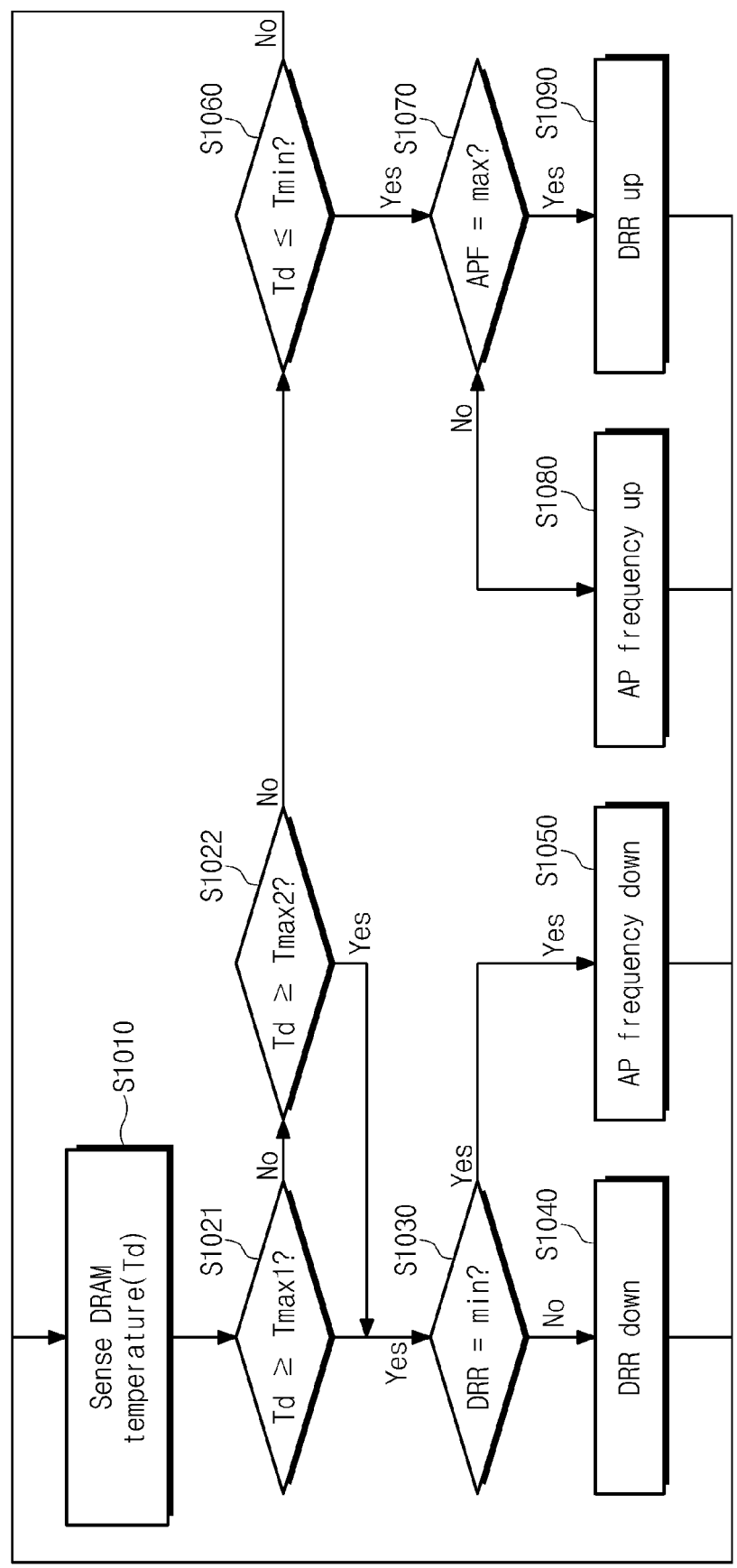
FIG. 21 is a flow chart illustrating a second exemplary embodiment of a DRAM thermal management method in the multichip package illustrated in FIG. 19.

FIG. 21 is a flow chart illustrating a second exemplary embodiment of DRAM thermal management method in the multichip package illustrated in FIG. 19. Referring to FIGS. 19 and 21, the DRAM thermal management method is as follows.

The temperature measurement unit 2220 of the DRAM 2200 senses the DRAM temperature Td in response to a request from the outside of the multichip package or when power is supplied and transfers the sensed DRAM temperature Td to the central processing device 2120 of the AP 2100 (S1010).

The central processing unit 2120 distinguishes whether the DRAM temperature Td is equal to or higher than a first maximum temperature Tmax1 (S1021). If the DRAM temperature Td is equal to or higher than the first maximum temperature Tmax1, the central processing unit 2120 distinguishes whether a refresh rate (DRR) of the DRAM 2200 is the minimum value MIN (S1030).

If the refresh rate (DRR) of the DRAM 2200 is not the minimum value MIN, the central processing unit 2120 sets the refresh rate of the DRAM 2200 lower to lower the DRAM temperature Td (S1040). After that, operation proceeds to operation S1010. If the refresh rate (DRR) of the DRAM 2200 is the minimum value MIN, the central processing unit 2120 sets an operation frequency of the central processing unit 2200 lower to lower the DRAM temperature Td. After that, operation proceeds to operation S1010.

If the DRAM temperature Td is not equal to or higher than the first maximum temperature Tmax1, the central processing unit 2120 distinguishes whether the DRAM temperature Td is equal to or higher than the second maximum temperature Tmax2 (S1022). If the DRAM temperature Td is equal to or higher than the second maximum temperature Tmax2, operation proceeds to operation S1030. If the DRAM temperature Td is not equal to or higher than the second maximum temperature Tmax2, the method proceeds to operation S1060. However, it is noted that additional comparison operations may be performed to compare the temperature Td to Tmaxk, where k is an integer.

In operation S1060, the central processing unit 2120 distinguishes whether the DRAM temperature Td is equal to or lower than a minimum temperature Tmin (S1060). If the DRAM temperature Td is equal to or lower than the minimum temperature Tmin, the central processing unit 2120 distinguishes whether an operation frequency (APF) of the central processing unit 2120 is the maximum value (S1070).

If the operation frequency (APF) of the central processing unit 2120 is not the maximum value, the central processing unit 2120 sets the operation frequency (APF) higher to improve performance (S1080). If the operation frequency (APF) of the central processing unit 2120 is the maximum value, the central processing unit 2120 sets the refresh rate (DDR) of the DRAM 2200 higher to improve performance (S1090).

As described above, in the DRAM thermal management method of the multichip package 2000, refresh rates of the DRAM 2200 may be controlled or operation frequencies APF of the AP 2100 may controlled by comparing the sensed DRAM temperature Td with the threshold temperatures.

In the DRAM thermal management method in accordance with exemplary embodiments, the DRAM thermal management may be performed by controlling the refresh rate DRR of the DRAM 2200 according to the DRAM temperature Td, and then controlling the operation frequency APF of the AP 2100 while minimally sacrificing system performance.

Figure 22:
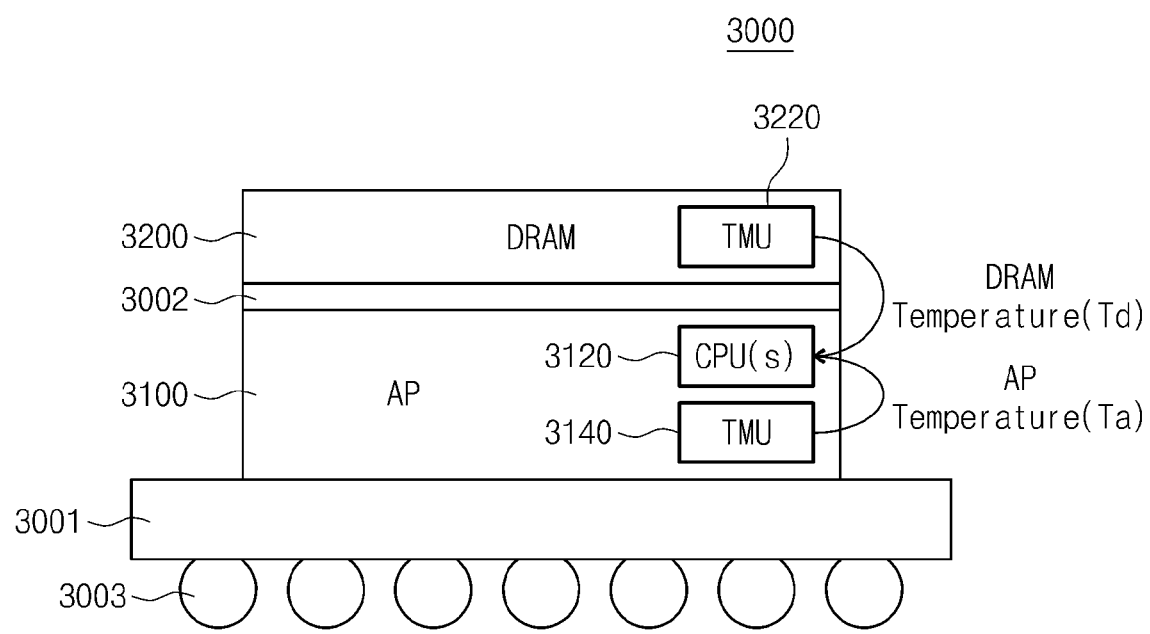
FIG. 22 is a drawing illustrating a second exemplary embodiment of multichip package in accordance with some exemplary embodiments.

FIG. 22 is a drawing illustrating a second exemplary embodiment of a multichip package. Referring to FIG. 22, the multichip package 3000 has a structure such that an AP 3100 and a DRAM 3200 are sequentially stacked on a circuit board 3001. As compared with the multichip package 2000 illustrated in FIG. 19, the multichip package 3000 further includes a temperature measurement unit 3140 for sensing a temperature of the AP 3100.

The multichip package 3000 manages heat of the DRAM 3200 by sensing an AP temperature Ta and a DRAM temperature Td, and then controlling the AP 3100 on the basis of the sensed AP temperature Ta and the sensed DRAM temperature Td. Heat of the DRAM 3200 may be managed on the basis of a difference between the AP temperature Ta and the DRAM temperature Td.

Figure 23:
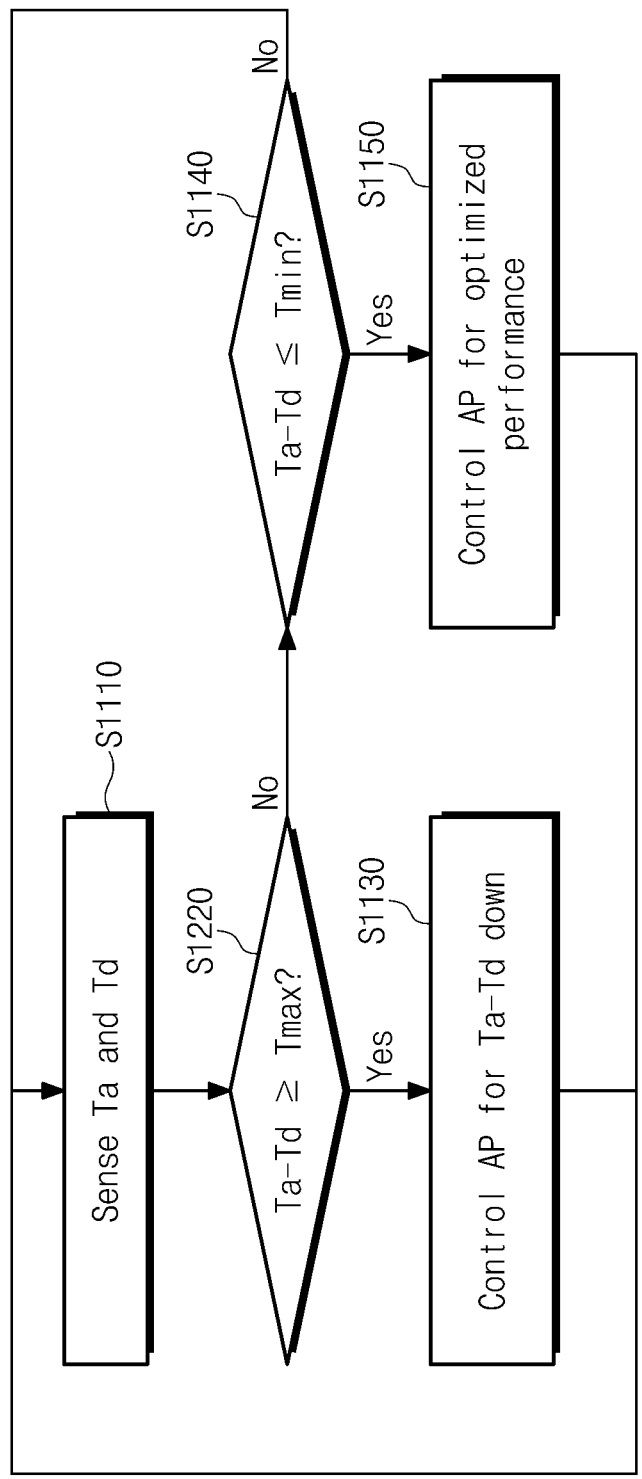
FIG. 23 is a flow chart illustrating an exemplary embodiment of a DRAM thermal management method in the multichip package illustrated in FIG. 22.

FIG. 23 is a flow chart illustrating an exemplary embodiment of DRAM thermal management method in the multichip package illustrated in FIG. 22. Referring to FIGS. 22 and 23, the DRAM thermal management method is as follows.

The temperature measurement unit 3220 of the DRAM 3200 senses the DRAM temperature Td in response to a request from the outside of the multichip package or when power is supplied and transfers the sensed DRAM temperature Td to the central processing device 3120 of the AP 3100. Also, the temperature measurement unit 3140 of the AP 3100 senses the AP temperature Ta and transfers the sensed AP temperature Ta to the central processing unit 3120 (S1110).

The central processing unit 3120 distinguishes whether a difference between the AP temperature Ta and the DRAM temperature Td is equal to or higher than a maximum temperature Tmax (S1220).

If the difference between the AP temperature Ta and the DRAM temperature Td is equal to or higher than the maximum temperature Tmax, the AP 3100 is controlled to lower a temperature difference (Ta−Td) (S1130). After that, operation proceeds to operation S1110.

If the difference between the AP temperature Ta and the DRAM temperature Td is not equal to or higher than the maximum temperature Tmax, the central processing unit 3120 distinguishes whether the difference between the AP temperature Ta and the DRAM temperature Td is equal to or lower than a minimum temperature Tmin (S1140).

If the difference between the AP temperature Ta and the DRAM temperature Td is equal to or lower than the minimum temperature Tmin, the AP 3100 is controlled for optimized performance (S1150). After that, operation proceeds to operation S1110. If the difference between the AP temperature Ta and the DRAM temperature Td is not equal to or lower than the minimum temperature Tmin, operation proceeds to operation S1110.

In the DRAM thermal management method in accordance with some exemplary embodiments, heat of the DRAM 3200 is managed by controlling the AP 3100 on the basis of the difference between the AP temperature Ta and the DRAM temperature Td.

Figure 24:
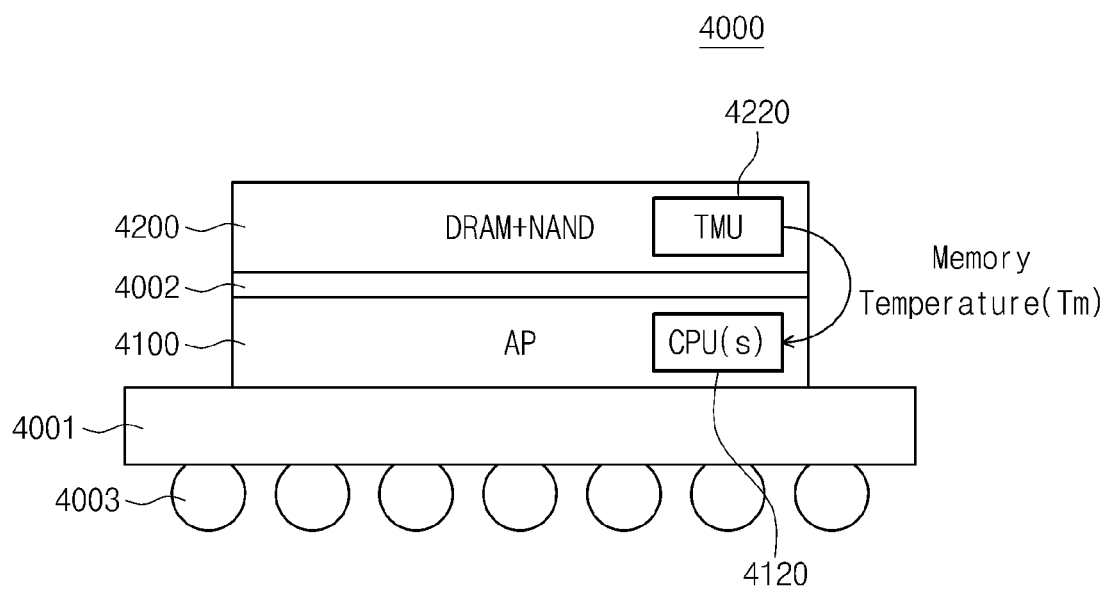
FIG. 24 is a drawing illustrating a third exemplary embodiment of multichip package in accordance with some exemplary embodiments.

FIG. 24 is a drawing illustrating a third exemplary embodiment of a multichip package. Referring to FIG. 24, the multichip package 4000 has a structure such that an AP 4100 and a memory 4200 are sequentially stacked on a circuit board 4001. The memory 4200 includes at least one DRAM, at least one NAND flash memory and a temperature measurement unit 4220 measuring a memory temperature Tm.

The multichip package 4000 manages heat of the memory 4200 by controlling the AP 4100 on the basis of the memory temperature Tm.

Figure 25:
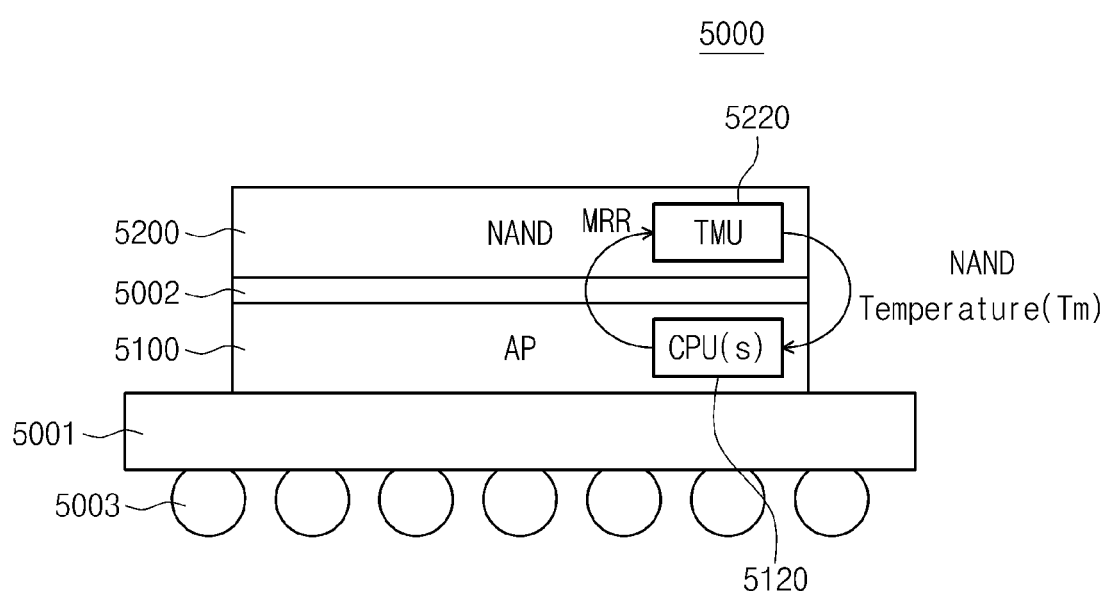
FIG. 25 is a drawing illustrating a fourth exemplary embodiment of multichip package in accordance with some exemplary embodiments.

FIG. 25 is a drawing illustrating a fourth exemplary embodiment of a multichip package. Referring to FIG. 25, the multichip package 5000 has a structure such that an AP 5100 and a NAND flash memory 5200 are sequentially stacked on a circuit board 5001. The NAND flash memory 5200 includes a temperature measurement unit 5220 sensing a temperature Tn of the NAND flash memory in response to a temperature measurement request command MRR of a central processing unit 5120 and transferring the sensed NAND flash memory temperature Tn to the central processing unit 5120. Information related to the sensed NAND flash memory temperature Tn may be transferred through at least one data line.

The multichip package 5000 manages heat of the memory 5200 by controlling the AP 5100 on the basis of the NAND flash memory temperature Tm sensed in response to the temperature measurement command MRR.

Figure 26:
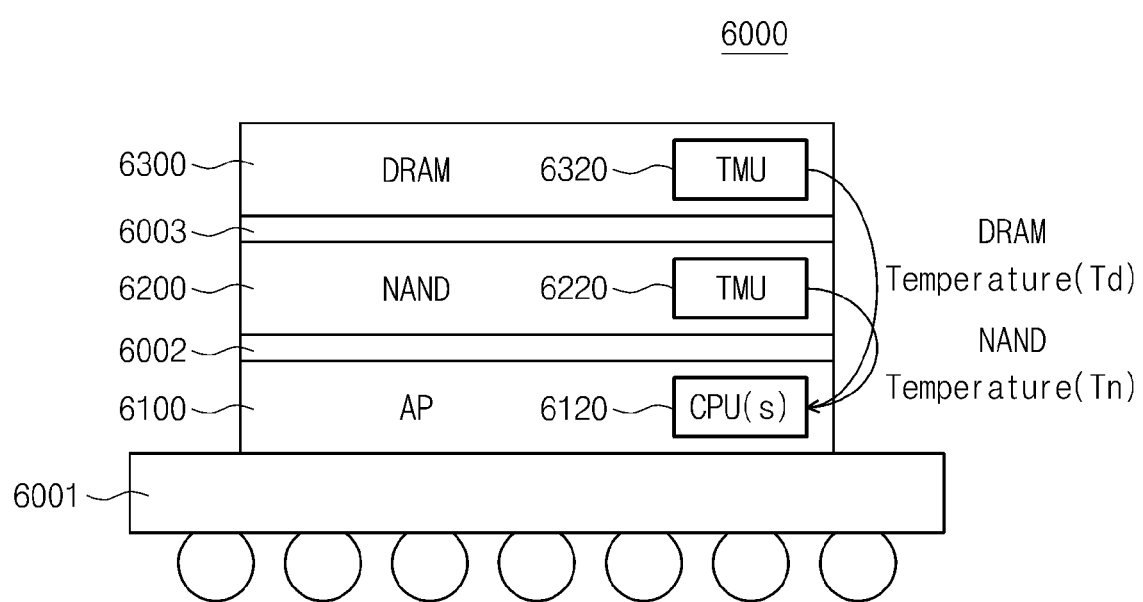
FIG. 26 is a drawing illustrating a fifth exemplary embodiment of multichip package in accordance with some exemplary embodiments.

FIG. 26 is a drawing illustrating a fifth exemplary embodiment of a multichip package. Referring to FIG. 26, the multichip package 6000 has a structure such that an AP 6100, a NAND flash memory 6200 and a DRAM 6300 are sequentially stacked on a circuit board 6001. A first spacer 6002 is located between the AP 6100 and the NAND flash memory 6200 and a second spacer 6003 is located between the NAND flash memory 6200 and the DRAM 6300.

The NAND flash memory 6200 includes a temperature measurement unit 6220 sensing a temperature Tn of the NAND flash memory and transferring the sensed temperature Tn of the NAND flash memory to the central processing unit 6120.

The DRAM 6300 includes a temperature measurement unit 6320 sensing a DRAM temperature Td and transferring the sensed the DRAM temperature Td to the central processing unit 6120.

The multichip package 6000 manages heat of the NAND flash memory 6200 and the DRAM 6300 by controlling the AP 6100 on the basis of the sensed temperature Tn of the NAND flash memory and the sensed DRAM temperature Td.

Figure 27:
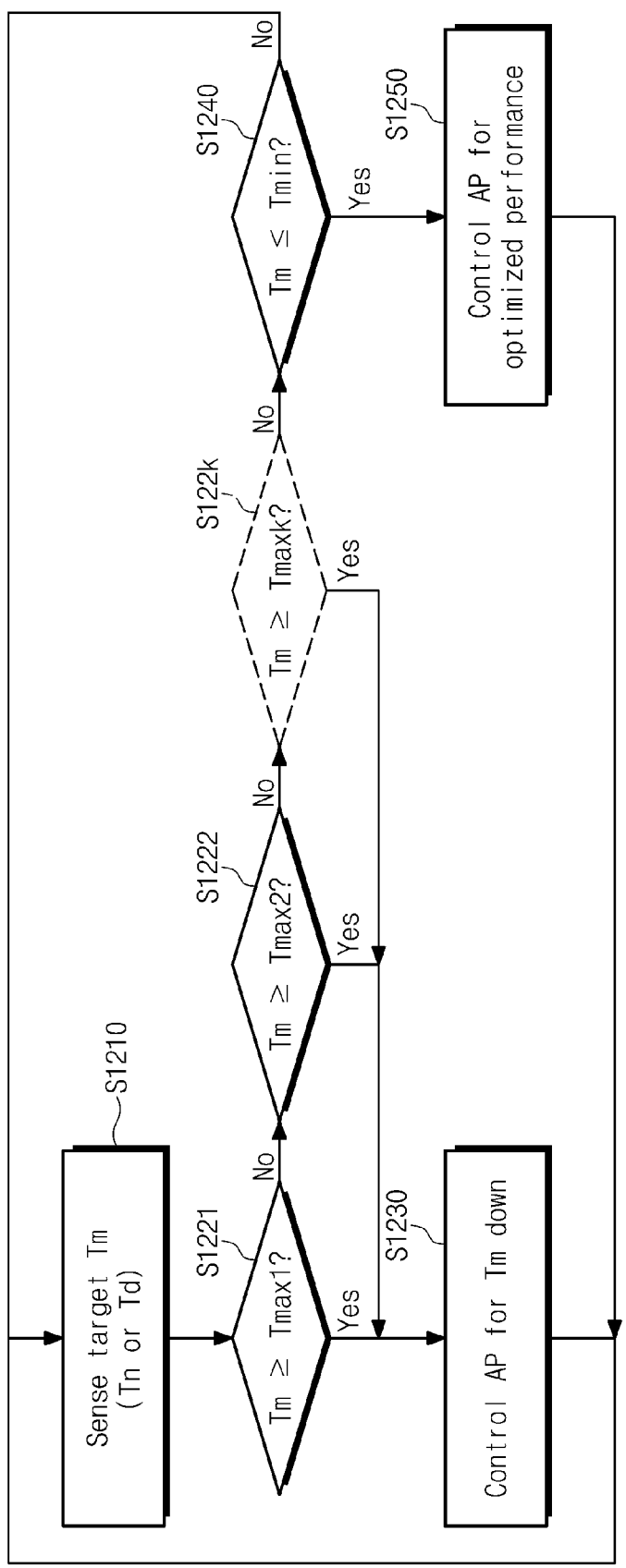
FIG. 27 is a flow chart illustrating a memory thermal management method in the multichip package illustrated in FIG. 26.

FIG. 27 is a flow chart illustrating a memory thermal management method in the multichip package illustrated in FIG. 26. Referring to FIGS. 26 and 27, the memory thermal management method is as follows.

A target memory for thermal management between the NAND flash memory 6200 and the DRAM 6300 is set up. The target memory may be set up by a user of the multichip package 6000. The target memory may also be set to be a memory having a higher temperature between a temperature Tn of NAND flash memory and a DRAM temperature Td. The memory (i.e., the NAND flash memory 6200 or the DRAM 6300) that is set as the set memory temperature measurement unit measures a temperature Tm of the target memory and transfers the measured temperature Tm to a central processing unit 6120 (S1210).

The central processing unit 6120 distinguishes whether the temperature Tm of target memory is equal to or higher than a first maximum temperature Tmax1 (S1221). If the temperature Tm of target memory is equal to or higher than the first maximum temperature Tmax1, the AP 6100 is controlled to lower the temperature Tm of target memory (S1230). After that, operation proceeds to operation S1210. The first maximum temperature Tmax1 may be different depending on whether the target memory is the NAND flash memory 6200 or the DRAM 6300. Alternatively, the first maximum temperature Tmax1 may be same regardless of whether the target memory is the NAND flash memory 6200 or the DRAM 6300.

If the temperature Tm of target memory is not equal to or higher than the first maximum temperature Tmax1, the central processing unit 6120 distinguishes whether the temperature Tm of target memory is equal to or higher than a second maximum temperature Tmax2 (S1222). If the temperature Tm of target memory is equal to or higher than the second maximum temperature Tmax2, operation proceeds to operation S1230 to lower the temperature Tm of target memory.

If the temperature Tm of target memory is not equal to or higher than the second maximum temperature Tmax2, the central processing unit 6120 distinguishes whether the temperature Tm of target memory is equal to or higher than a kth maximum temperature Tmaxk (k is an integer which is 3 or more) (S122k). If the temperature Tm of target memory is equal to or higher than the kth maximum temperature Tmaxk, operation proceeds to operation S1230 to lower the temperature Tm of target memory. The S122k may be omitted or a plurality of operations similar to operation S1222 for precisely controlling the AP 6100 may be further included.

If the temperature Tm of the target memory is not equal to or higher than the kth maximum temperature Tmaxk, the central processing unit 6120 distinguishes whether the temperature Tm of target memory is equal to or lower than a minimum temperature Tmin (S1240). If the temperature Tm of target memory is equal to or lower than the minimum temperature Tmin, the AP 6100 is controlled to improve performance (S1250). After that, operation proceeds to operation S1210. If the temperature Tm of target memory is not equal to or lower than the minimum temperature Tmin, operation proceeds to operation S1210.

As described above, in the memory thermal management method of the multichip package 6000, a target memory for a thermal management is set up, a temperature of the set target memory is sensed and heat of the target memory is managed on the basis of the sensed temperature Tm of the target memory.

Figure 28:
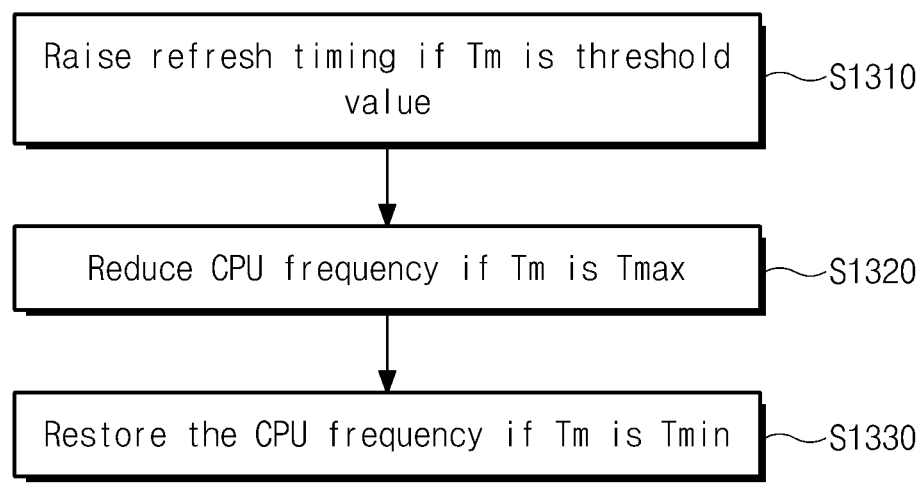
FIG. 28 is a flow chart illustrating a memory thermal management method in the multichip package in accordance with some exemplary embodiments.

FIG. 28 is a flow chart illustrating a memory thermal management method in a multichip package in accordance with some exemplary embodiments. Referring to FIG. 28, the memory thermal management method is as follows.

If the sensed memory temperature Tm is a given value, refresh timing is increased (S1310). After that, once the memory temperature Tm becomes the maximum temperature Tmax, an operation frequency of the CPU is reduced (S1320).

After that, once the sensed memory temperature Tm is lowered to be the minimum temperature Tmin, an operation frequency of the CPU is restored (S1330).

In the memory thermal management method, heat of the memory is managed by controlling a refresh timing first, and then controlling an operation frequency of the CPU.

However, in the memory thermal management method, it is not necessary to control refresh timing first. As an alternative, an operation frequency of the CPU may be controlled, and then a refresh timing may be controlled.

In the memory thermal management method, heat of the memory may be managed by variously combining the operations S1310, S1320 and S1330.

The inventive concept may be applied to a mobile device.

Figure 29:
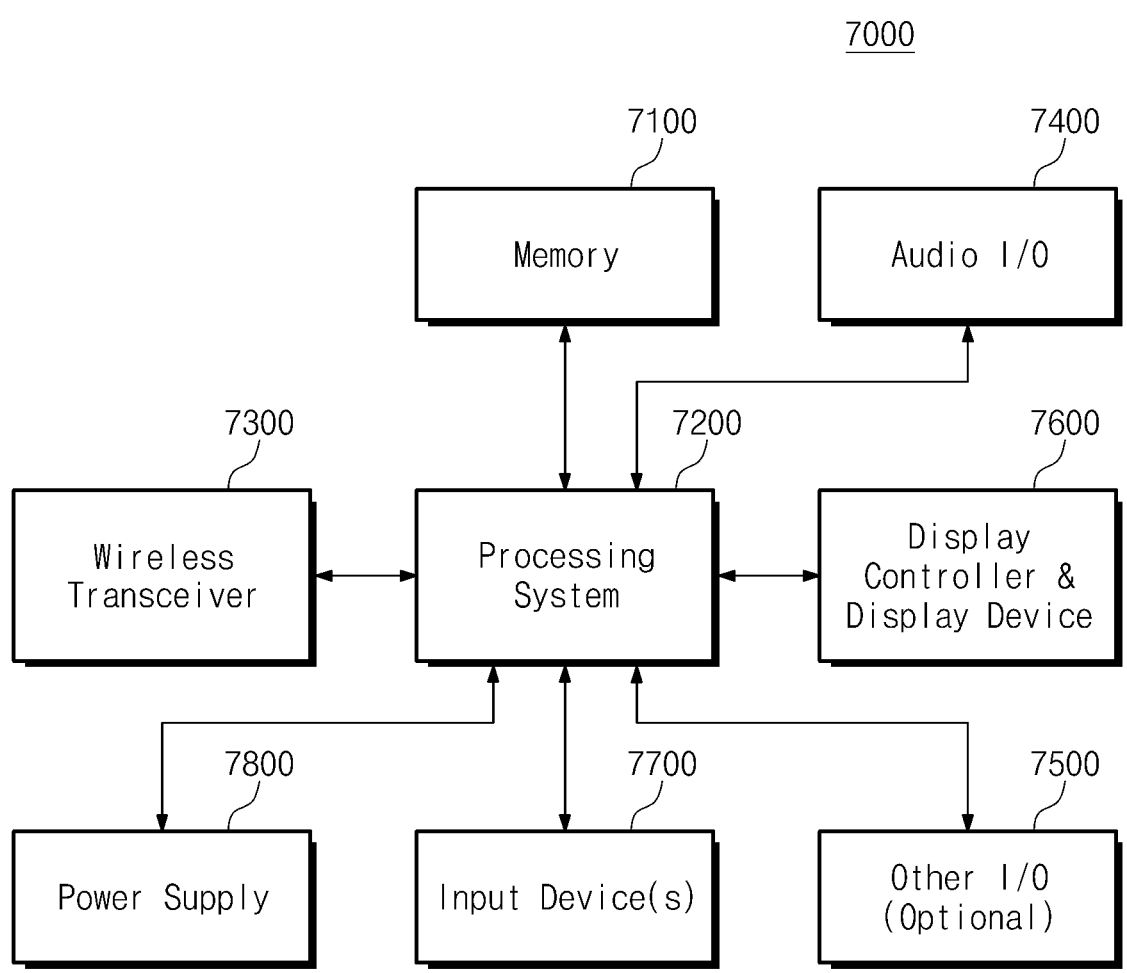
FIG. 29 is a block diagram of mobile device in accordance with some exemplary embodiments.

FIG. 29 is a block diagram of a mobile device in accordance with some exemplary embodiments. Referring to FIG. 29, the mobile device 7000 includes a memory 7100, a processing system 7200, a wireless transceiver 7300, an audio input/output (I/O) device 7400, an other input/output (I/O) device 7500, a display controller and display device 7600, an input device 7700 and a power supply 7800. The wireless transceiver 7300 may be, for example, a radio frequency (RF) transceiver, a bluetooth transceiver, a WiFi transceiver, an infrared (IR) transceiver, a wireless cellular telephony transceiver, etc. The processing system may be, for example, a microprocessor.

The mobile device 7000 may be implemented by the mobile device 10 illustrated in FIG. 1 and the surface temperature management method of the mobile device 10. The mobile device 7000 may also be implemented by the multichip package 1000 illustrated in FIG. 17 and the memory thermal management method thereof.

The mobile device is described in detail in U.S. Patent Application Publication No. 2009-0305732, which is herein incorporated by reference.

The present inventive concept may be applied to a tablet PC.

Figure 30:
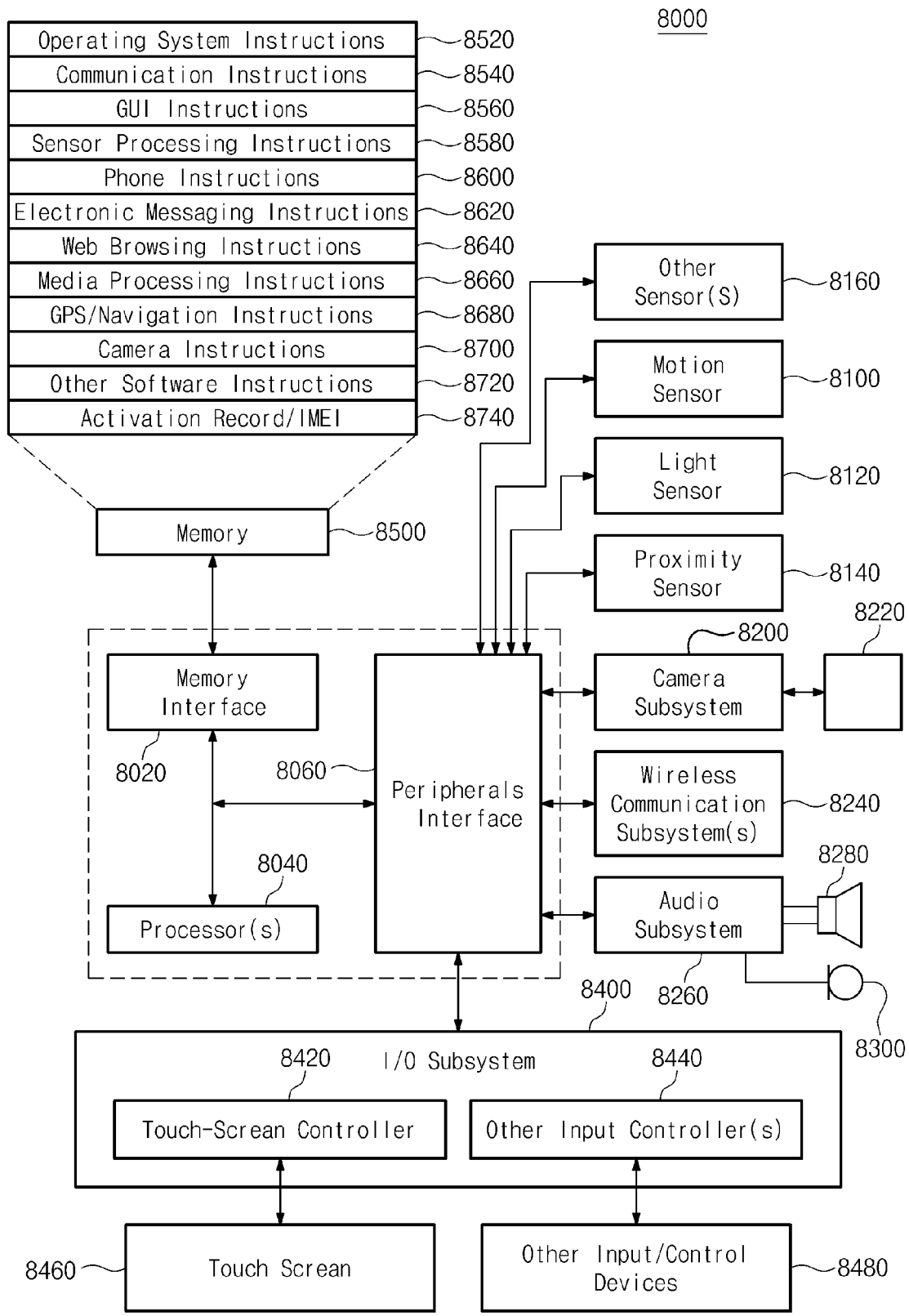
FIG. 30 is a block diagram of tablet PC in accordance with some exemplary embodiments.

FIG. 30 is a block diagram of tablet PC in accordance with some exemplary embodiments. Referring to FIG. 30, the tablet PC 8000 manages heat of a memory 8500.

The tablet PC 8000 may be implemented by the mobile device 10 illustrated in FIG. 1 and a surface temperature management method thereof. The tablet PC may also be implemented by the multichip package 1000 illustrated in FIG. 17 and the memory thermal management method thereof.

The tablet PC is described in detail in U.S. Patent Application Publication No. 2009-0307105, which is herein incorporated by reference.

The AP and the memory of the present inventive concept may be mounted using various types of packages such as, for example, package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

The mobile device in accordance with exemplary embodiments may manage a surface temperature in real time using a surface temperature management table.

Also, the multichip package in accordance with exemplary embodiments may control a memory temperature by controlling an application processor according to the memory temperature.

The above-disclosed subject matter is to be considered illustrative, and not restrictive, and the appended claims are intended to cover all such modifications, enhancements, and other exemplary embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A surface temperature management method of a mobile device, the method comprising:

sensing, by a temperature measurement unit, a first temperature of an application processor performing a first function of the mobile device;

decreasing, by a dynamic thermal management module, at least one among an operation frequency and a frame rate of the application processor performing the first function in response to the sensed first temperature being greater than or equal to a first target high temperature of the application processor performing the first function, the first function and the first target high temperature of the application processor performing the first function being preset in a surface temperature management table to manage a surface temperature of a target part of the mobile device;

sensing, by the temperature measurement unit, a second temperature of the application processor performing a second function of the mobile device, the second function being different than the first function; and decreasing, by the dynamic thermal management module, at least one among the operation frequency and the frame rate of the application processor performing the second function, in response to the sensed second temperature being greater than or equal to a second target high temperature of the application processor performing the second function, the second function and the second target high temperature of the application processor performing the second function being preset in the surface temperature management table to manage the surface temperature of the target part of the mobile device, wherein the surface temperature management table comprises surface temperature information, application processor temperature information, application processor operation frequency control information and frame rate control information in accordance with an operation mode.

2. The surface temperature management method of claim 1, wherein the sensing the first temperature of the application processor performing the first function comprises sensing, by the temperature measurement unit, a junction temperature of the application processor performing the first function.

3. The surface temperature management method of claim 1, further comprising decreasing, by the dynamic thermal management module, at least one among the operation frequency and the frame rate of the application processor performing the first function, in response to the sensed first temperature being less than the first target high temperature of the application processor performing the first function and the sensed first temperature being greater than or equal to a second target high temperature of the application processor performing the first function, the second target high temperature of the application processor performing the first function being preset in the surface temperature management table.

4. The surface temperature management method of claim 1, further comprising increasing, by the dynamic thermal management module, at least one among the operation frequency and the frame rate of the application processor performing the first function, in response to the sensed first temperature being less than the first target high temperature of the application processor performing the first function and the sensed first temperature being less than or equal to a target low temperature of the application processor performing the first function, the target low temperature of the application processor performing the first function being preset in the surface temperature management table.

5. The surface temperature management method of claim 1, further comprising setting, by the dynamic thermal management module, an operation frequency of the application processor performing the first function to be a first minimum operation frequency, in response to the sensed first temperature being greater than or equal to the first target high temperature of the application processor performing the first function, the first minimum operation frequency being preset in the surface temperature management table.

6. The surface temperature management method of claim 5, further comprising setting, by the dynamic thermal management module, the operation frequency of the application processor performing the first function to be a second minimum operation frequency greater than the first minimum operation frequency, in response to the sensed first temperature being less than the first target high temperature of the application processor performing the first function and the sensed first temperature being greater than or equal to a second target high temperature of the application processor performing the first function, the second minimum operation frequency and the second target high temperature of the application processor performing the first function being preset in the surface temperature management table.

7. The surface temperature management method of claim 1, further comprising setting, by the dynamic thermal management module, an operation frequency of the application processor performing the first function to be a maximum operation frequency, in response to the sensed first temperature being less than the first target high temperature of the application processor performing the first function and the sensed first temperature being less than or equal to a target low temperature of the application processor performing the first function, the maximum operation frequency and the target low temperature of the application processor performing the first function being preset in the surface temperature management table.

* * * * *